US012571467B2

(12) United States Patent
Jasud et al.

(10) Patent No.: US 12,571,467 B2
(45) Date of Patent: Mar. 10, 2026

(54) GEAR BOX WITH LUBRICATION CHANNEL

(71) Applicant: DANA (WUXI) TECHNOLOGY CO., LTD., JiangSu (CN)

(72) Inventors: Pradip Jasud, Pune (IN); Shailesh Dalvi, Pune (IN); Sushil Patil, Pune (IN); Yunping Song, Wuxi (CN)

(73) Assignee: DANA (WUXI) TECHNOLOGY CO. LTD., Wuxi (CN)

( * ) Notice: Subject to any disclaimer, the term of this patent is extended or adjusted under 35 U.S.C. 154(b) by 0 days.

(21) Appl. No.: 18/446,024

(22) Filed: Aug. 8, 2023

(65) Prior Publication Data

US 2024/0102547 A1      Mar. 28, 2024

Related U.S. Application Data

(60) Provisional application No. 63/377,463, filed on Sep. 28, 2022.

(51) Int. Cl.
F16H 57/04          (2010.01)

(52) U.S. Cl.
CPC ..... F16H 57/0424 (2013.01); F16H 57/0471 (2013.01)

(58) Field of Classification Search
CPC ........................ F16H 57/0424; F16H 57/0471
See application file for complete search history.

(56) References Cited

U.S. PATENT DOCUMENTS

| | | | |
|---|---|---|---|
| 4,222,283 A | 9/1980 | Nagy | |
| 6,345,712 B1 | 2/2002 | Dewald et al. | |
| 11,079,007 B2 | 8/2021 | Sheridan et al. | |
| 2009/0186737 A1* | 7/2009 | Matsumoto | ......... F16H 57/0483 475/160 |
| 2009/0290976 A1 | 11/2009 | Suciu et al. | |
| 2015/0267803 A1 | 9/2015 | Marathe et al. | |
| 2019/0249765 A1* | 8/2019 | Ito | ............... B60K 1/00 |
| 2020/0158228 A1* | 5/2020 | Ohkawa | ............... B60K 17/344 |
| 2021/0071751 A1* | 3/2021 | Fujii | ............... B60K 1/00 |
| 2023/0279944 A1* | 9/2023 | Gallege | ............... F16H 57/0495 |

FOREIGN PATENT DOCUMENTS

| | | | | |
|---|---|---|---|---|
| CN | 111692324 B | * | 7/2021 | ........... F16H 57/042 |
| EP | 3056763 A1 | | 8/2016 | |
| EP | 3464953 B1 | | 10/2021 | |
| WO | 2013167541 A1 | | 11/2013 | |

* cited by examiner

*Primary Examiner* — William C Joyce
(74) *Attorney, Agent, or Firm* — McCoy Russell LLP

(57)          ABSTRACT

A high speed gear box including ribs, gears with holes, and oil channels configured to divide and distribute lubricating oil and contacting the lubricating oil with a high speed gear box housing wall. The high speed gear box housing and gear box cover have lubricating oil channel which supply lubricants to bearings. Output gears have holes which circulate oil throughout the high speed gear box. As lubricating oil is continuously circulated at locations which may create friction, the thermal energy, which is generated by high speed rotation of gears, shafts, and bearings is absorbed by cooling oil and transferred to housings, latent heat is dissipated to atmosphere through housing wall. This solves the overheating problem of electric high speed gear box.

9 Claims, 21 Drawing Sheets

SECTION Y-Y

SECTION Y-Y
(HOUSING SIDE)

SECTION W-W

SECTION V-V

SECTION Y-Y

SECTION X-X

SECTION Y-Y

SECTION X-X

SECTION W-W

SECTION X-X

SECTION W-W

SECTION X-X

GEAR BOX WITH LUBRICATION CHANNEL

CROSS REFERENCE TO RELATED APPLICATIONS

The present application claims priority to U.S. Provisional Application No. 63/377,463 entitled "GEAR BOX WITH LUBRICATION CHANNEL" filed Sep. 28, 2022. The entire contents of the above identified application is hereby incorporated by reference for all purposes.

TECHNICAL FIELD

The present description relates generally to methods and systems for cooling a high speed gear box.

BACKGROUND AND SUMMARY

Heavy machinery vehicles such as a container handler may include a motor and a driveline configured to transmit mechanical power output by the motor to wheels of the vehicle. The driveline may include a high speed reduction gear box comprising a helical gear pair and two planetary assemblies for each front wheel of the vehicle. The high speed reduction gear box may also be referred to as the high speed gear box. Rotation of the gear pair and planetary assemblies during vehicle operation may result in excessive heating of lubricating oil which may degrade components of the high speed gear box.

Previous attempts to address excessive heating of lubricating oil inside the high speed gear box include placing forced cooling external to the high speed gear box to cool lubricating oil inside the high speed gear box. Such external forced cooling systems may add to a total cost of the vehicle.

In one example, a powertrain of a vehicle may comprise a motor, a three stage reduction wheel end assembly configured to transfer mechanical power from the motor to a wheel of the vehicle, and wherein a first stage of the three stage reduction wheel end assembly is positioned within a high speed gear box, and wherein the high speed gear box includes a plurality of ribs, oil galleries, and oil retainer features configured to circulate lubricant oil throughout the high speed gear box. In this way a high speed gear box is provided wherein heat generated by gears, shafts, and bearings within the high speed gear box may be absorbed by lubricating oil. The heated lubricating oil may be directed towards a housing wall of the high speed gear box to dissipate the absorbed heat outside the high speed gear box to the atmosphere. In this way a temperature of lubricating oil in contact with gears, shafts, and bearings of the high speed gear box may be maintained and degradation of the gears, shafts, and bearings may be postponed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
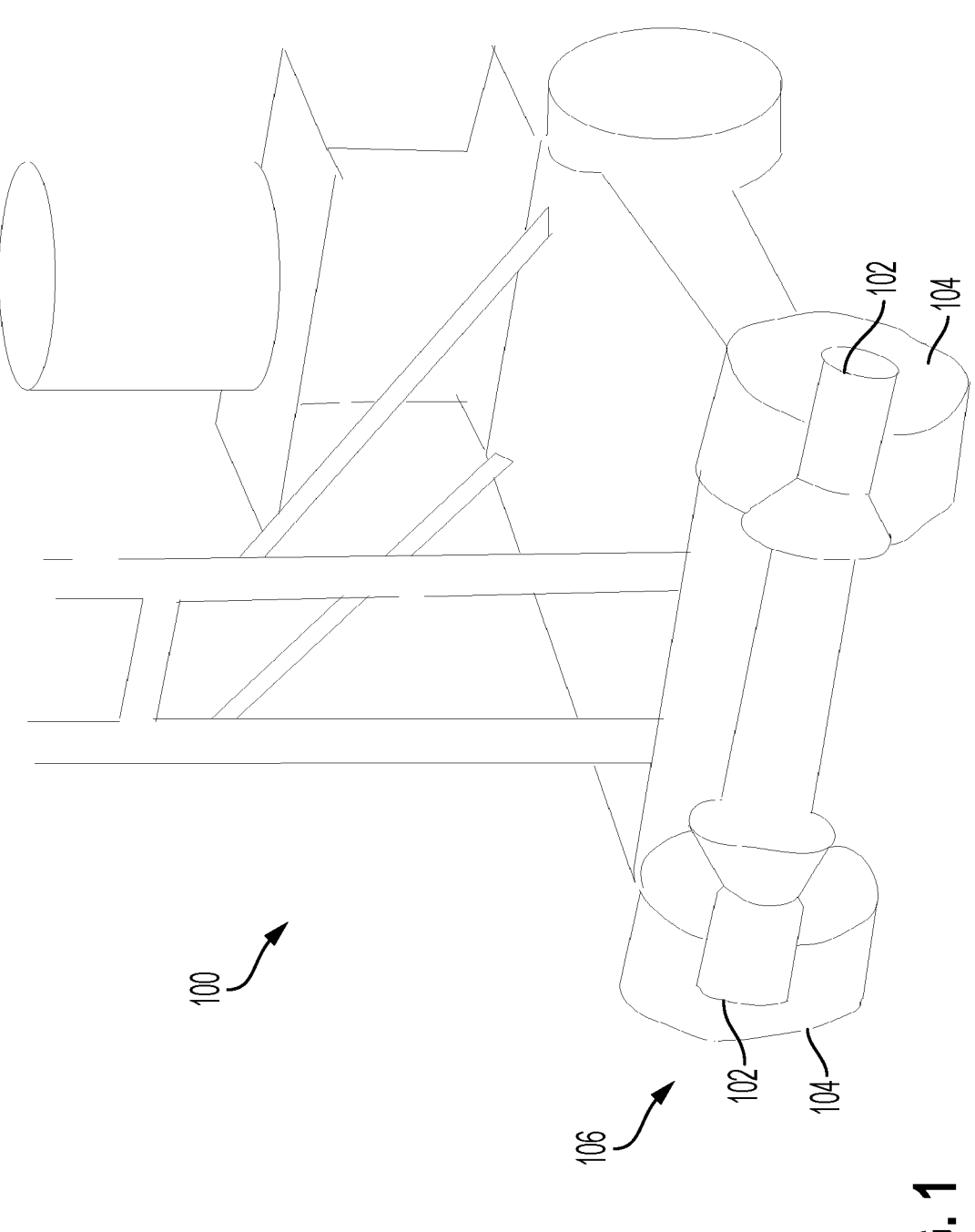
FIG. 1 shows an illustration of a heavy duty vehicle including a high speed gear box.
Figure 2:
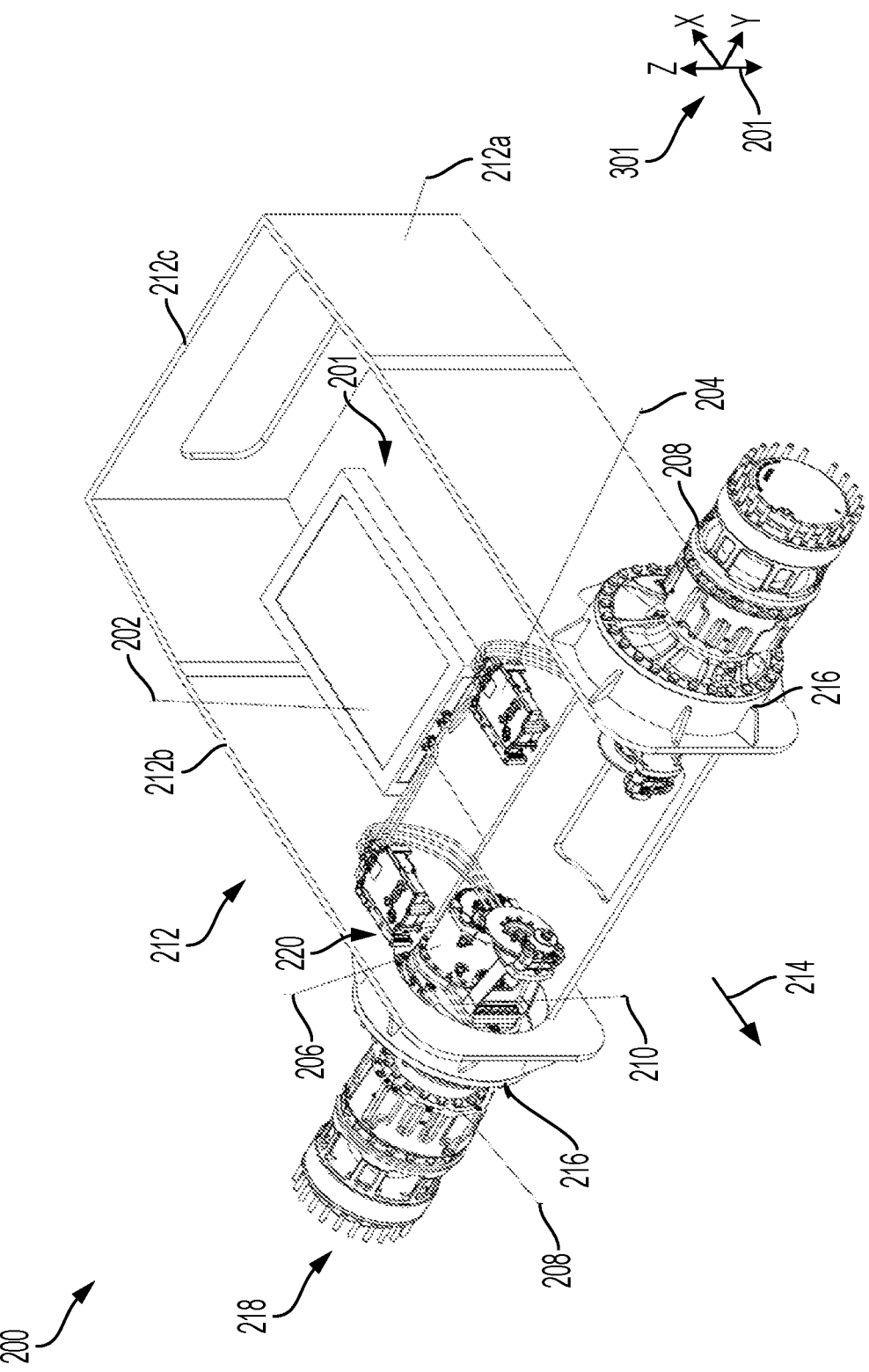
FIG. 2 shows an example of an electric driveline.

The following disclosure relates to a high speed gear box for a driveline of a vehicle such as the vehicle shown in FIG. 1. The driveline may be an electric driveline including a battery, electric motors, and three-stage reduction wheel end assemblies as shown in FIG. 2. Perspective, front, side, and sectional views of a high speed reduction gear box according to an exemplary embodiment are shown in FIGS. 3A-8B. Herein, high speed reduction gear box may also be shortened to high speed gear box. The high speed gear box may include ribs, holes, and oil retaining features configured to distribute lubricating oil at strategic locations between rotating parts of the gear box. Movement of lubricating oil within the high speed gear box is shown in sectional views of the high speed gear box in FIGS. 9-16. Movement of lubricating oil during counterclockwise movement of an input pinion shaft is shown in FIGS. 9-10 and 15-16. Movement of lubricating oil during clockwise movement of the input pinion shaft is shown in FIGS. 11-12 and 13-14.

Turning now to FIG. 1, an example is shown of a vehicle 100 which may be a loaded container handler. However, other types of vehicles have been considered within the scope of this disclosure. Vehicle 100 may include a plurality of wheels 106 and two electric wheel drivelines 102, one for each drive wheel 104 of the plurality of wheels 106. In one example, as shown in FIG. 1, each drive wheel 104 may be front wheels of vehicle 100. However, other positions of each drive wheel have been considered within the scope of this disclosure. Vehicle 100 may also include at least one motor configured to convert an input power to mechanical power which may be transmitted to one or more of the plurality of wheels 106. In one embodiment, the at least one motor may be an electric motor and the input power may be electrical power supplied by a battery. Mechanical power may be transmitted to each drive wheel 104 through electric wheel end drivelines 102. Each drive wheel 104 is shown partially transparent to show relative positioning of drivelines 102 with respect to each drive wheel 104. The electric motor may be desirable due to resulting in a vehicle that does not emit any gases like carbon dioxide (CO2) carbon monoxide (CO), nitrogen oxides (NOx) during operation.

A view 200 isolating parts of an electric powertrain 201 of a vehicle (such as vehicle 100 of FIG. 1) is shown in FIG. 2. A co-ordinate system 301 is provided for comparison of the views shown in FIGS. 3A-16. An x-axis corresponds to a longitudinal axis. Arrow 214 may be parallel to the x-axis and indicates a direction of forward travel of the vehicle. Additionally, the x-axis corresponds to a radial direction with respect to rotation of wheels of the vehicle. The y-axis corresponds to a lateral axis as well as an axial direction with respect to rotation of the wheels of the vehicle. A z-axis is perpendicular to both the x-axis and the y-axis. An arrow 201 is parallel to the z-axis and corresponds to a direction of gravity.

Components of electric powertrain 201 may be securely fastened to a vehicle chassis 212. Vehicle chassis 212 may include a first side 212a, a second side 212b, parallel to first side 212a, and a third side 212c perpendicular to first side 212a and second side 212b. A fourth side parallel to third side 212c is omitted to better show components of electric power train 201.

Electric powertrain 201 may include a battery pack 202, a motor control unit (MCU) 204, electric motor 206, and three stage reduction wheel end assembly 208. Although an electric motor and electric powertrain are depicted in FIG. 2, other types of motors and powertrains have been considered within the scope of the disclosure. Electric powertrain 201 may include a separate MCU 204, electric motor 206 and three stage reduction wheel end assemblies 208 for each front wheel of a vehicle (such as vehicle 100 of FIG. 1).

Each three stage reduction wheel end assembly 208 may include a wheel end 218 configured to couple to a wheel of the vehicle and a motor end 220 configure to couple to electric motor 206. First side 212a and second side 212b of vehicle chassis 212 may each include a front wheel well 216 positioned at a front (with respect to direction of forward travel of the vehicle) end. Front wheel well 216 may at least partially circumferentially surround and support motor end 220 of each three stage reduction wheel end assembly 208. Each three stage wheel end assembly 208 may comprise a first stage reduction including a helical gear pair and two planetary assemblies. A component first stage reduction including a helical gear pair is referred as a high speed reduction gear box 210. High speed reduction gear box 210 may be positioned at motor end 220 of three stage reduction wheel end assembly 208 closest to electric motor 206.

Figures 3A, 3B:
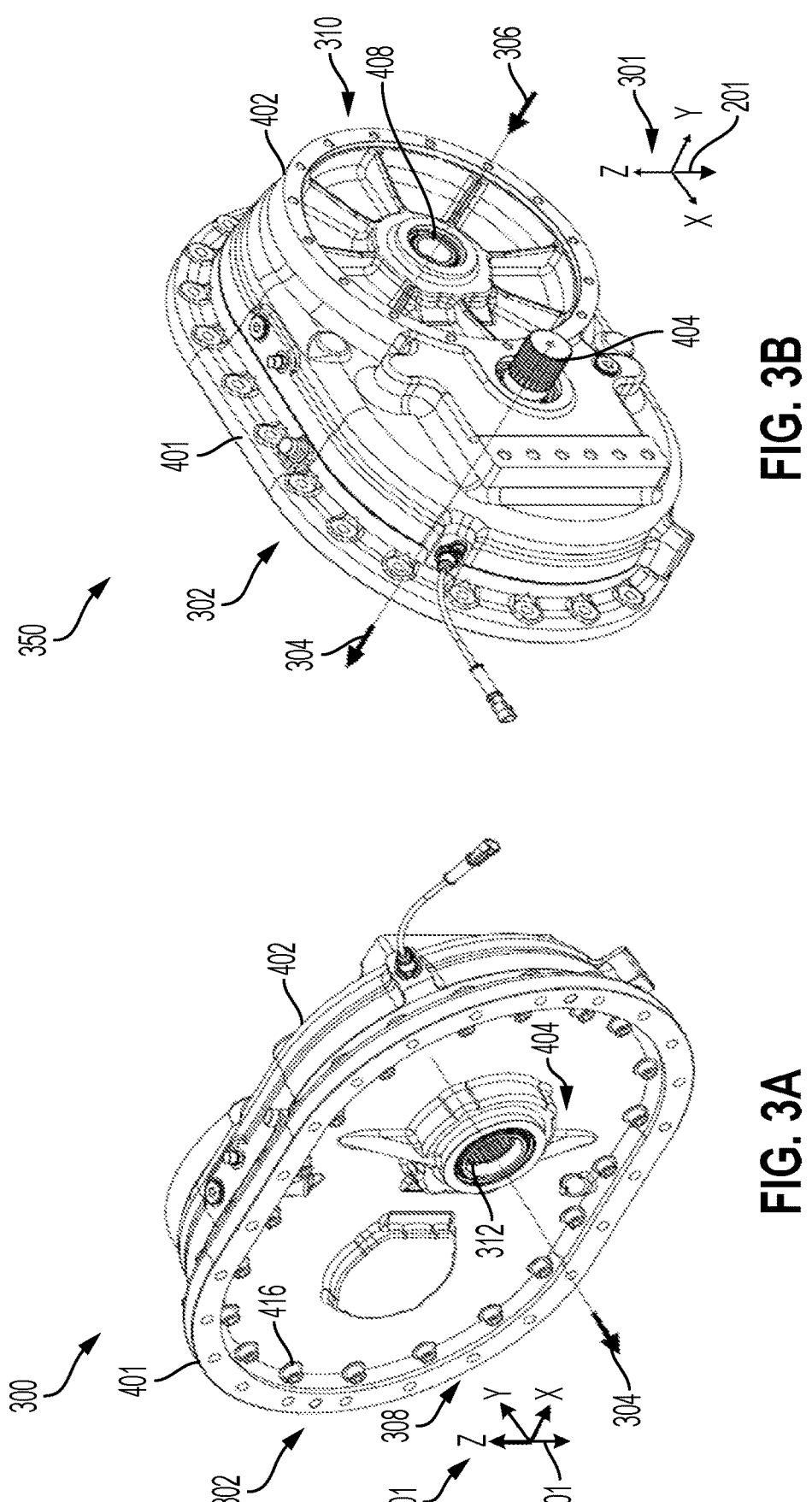
FIG. 3A shows a first perspective view of a high speed gear box.
FIG. 3B shows a second perspective view of the high speed gear box.

Perspective views of a high speed reduction gear box 302 according to an exemplary embodiment are shown in FIGS. 3A-16. High speed reduction gear box 302 may be the same as or similar to high speed reduction gear box 210 of FIG. 2. FIG. 3A shows a first perspective view 300 and FIG. 3B shows a second perspective view 350. Views 300 and 350 include first arrow 304 showing a direction relative to the high speed reduction gear box 302 in which a component coupled to an output of high speed reduction gear box 302 may be found. In one example, the component coupled to the output of high speed reduction gear box 302 may be a second stage of a three-stage reduction wheel end assembly (such as three stage reduction wheel end assembly 208 of FIG. 2). A reduction side 308 of high speed reduction gear box 302 may be a side facing first arrow 304. An output shaft may include an end 312 configured to couple to an input of the second stage. In one example end 312 may include splines configured to engage with the input of the second stage. View 350 further shows a second arrow 306 where a shaft of a motor (such as electric motor 206 of FIG. 2) may be coupled. A motor side 310 of high speed reduction gear box 302 may be a side facing second arrow 306.

Figure 4A:
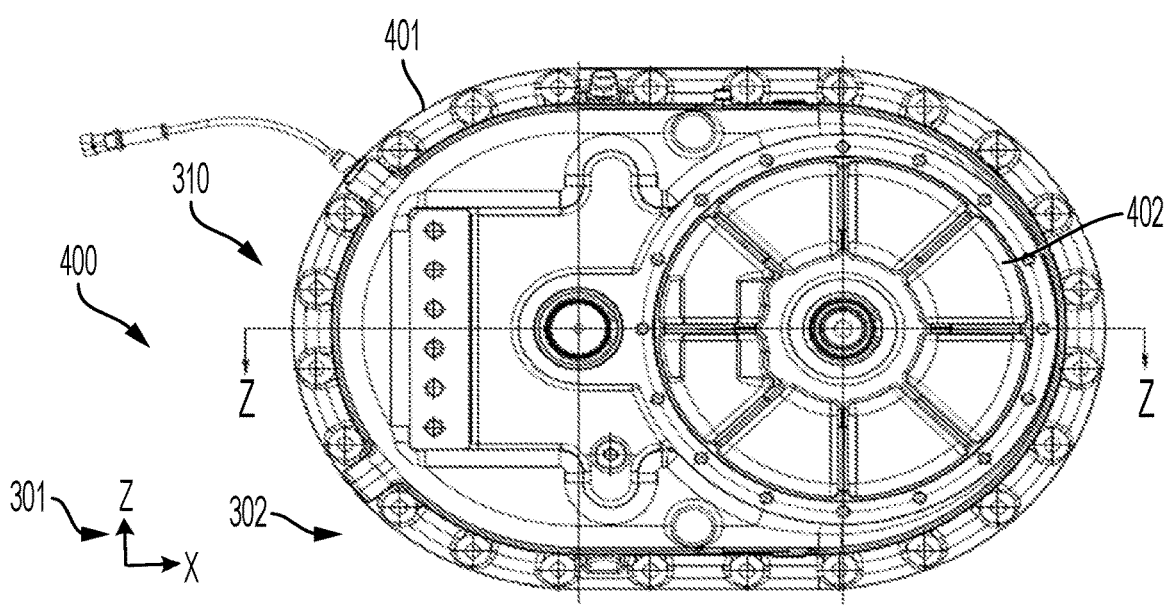
FIG. 4A shows a front view of the high speed gear box.
Figure 4B:
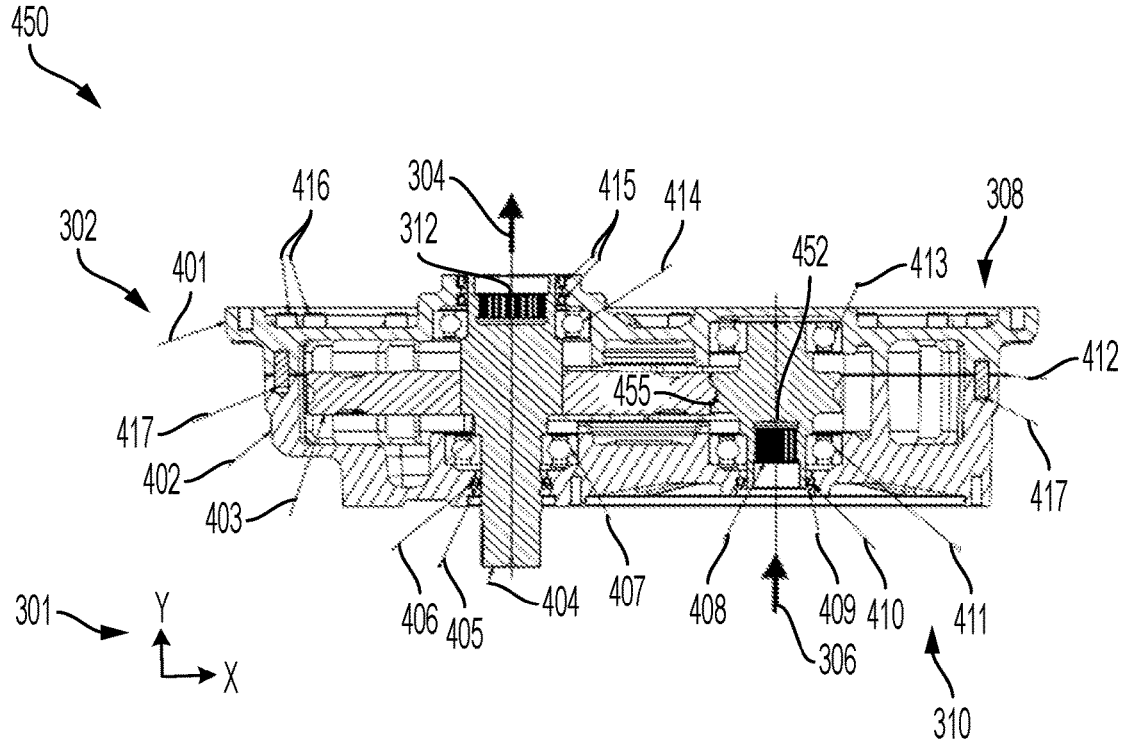
FIG. 4B shows a first sectional view of the high speed bear box.

FIG. 4A shows a front view 400 of motor side 310 of high speed gear box 302 viewed along the y axis. FIG. 4B shows a first sectional view 450 of high speed gear box 302 along an x-y plane. First sectional view 450 may correspond to a section along line Z-Z as shown in front view 400 of FIG. 4A. High speed gear box components labeled in FIGS. 3A-4A are described further below with respect to the sectional view shown in FIG. 4B.

Turning now to FIG. 4B, components of high speed gear box 302 are shown. High speed gear box 302 may include a high speed gear box cover 401, a gear box housing 402, an output helical gear 403, an output shaft 404, an output back up snap ring 405, an input back up snap ring 409, a motor side output rotary seal 406, a motor side input rotary seal 410, a motor side output ball bearing 407, a motor side input ball bearing 411, a motor side input pinion shaft 408, a gasket 412, a reduction side input ball bearing 413, a reduction side output ball bearing 414, a reduction side output rotary seals 415, fasteners 416, and dowels 417.

Motor side output rotary seal 406 and motor side output ball bearing 407 may be coupled to and circumferentially surround output shaft 404. Further, both motor side output rotary seal 406 and motor side output ball bearing 407 may be in face sharing contact with gear box housing 402. Output back up snap ring 405 may be positioned around motor side output rotary seal 406 and may thereby maintain a position of motor side output rotary seal 406 in face sharing contact with the high speed gear box housing 402. Motor side input rotary seal 410 and motor side input ball bearing 411 may fixedly couple to input pinion shaft 408 on motor side 310 of high speed gear box 302. Motor side input rotary seal 410 and motor side input ball bearing 411 may each be in face sharing contact with gear box housing 402, Further, motor side input ball bearing 411 may circumferentially surround input pinion shaft 408. Input back up snap ring 409 may be positioned around motor side input rotary seal 410 and may thereby maintain a position of motor side input rotary seal 410 in face sharing contact with high speed gear box housing 402.

Two reduction side output rotary seals 415 and one reduction side output ball bearing 414 may be coupled to output shaft 404 on reduction side 308. Reduction side output rotary seals 415 and reduction side output ball bearing 414 may each be in face sharing contact with high speed gear box cover 401. Further, reduction side output ball bearing 414 may circumferentially surround output shaft 404. Reduction side input ball bearing 413 may be coupled to and circumferentially surround input pinion shaft 408. Reduction side input ball bearing 413 may be in face sharing contact with high speed gear box cover 401.

Output helical gear 403 may be directly coupled to output shaft 404. High speed gear box cover 401 and high speed gear box housing 402 may together form walls of high speed gear box 302 and are connected to each other by fasteners 416 and dowels 417. Gasket 412 may be positioned between high speed gear box cover 401 and high speed gear box housing 402, forming a seal.

An electric motor (such as electric motor 206 of FIG. 2) may convert electric power of a battery to mechanical power and transfer power to input pinion shaft 408. An end 452 of input pinion shaft 408 may be configured to couple to an output of the electric motor. In one example end 452 may include splines formed to engage with the output of the electric motor. Power may be transferred from input pinion shaft 408 to output helical gear 403 through a helical gear mesh 455 between input pinion shaft 408 and output helical gear 403. Output shaft 404 may be coupled to output helical gear 403. The coupling may cause output shaft 404 to rotate in concert with output helical gear 403. In this way power from output helical gear 403 may be transferred to a second stage planetary assembly of a three-stage reduction wheel end assembly (such as three stage reduction wheel end assembly 208 of FIG. 2) via output shaft 404 coupled to an input of the second stage planetary assembly.

Figures 5A, 5B:
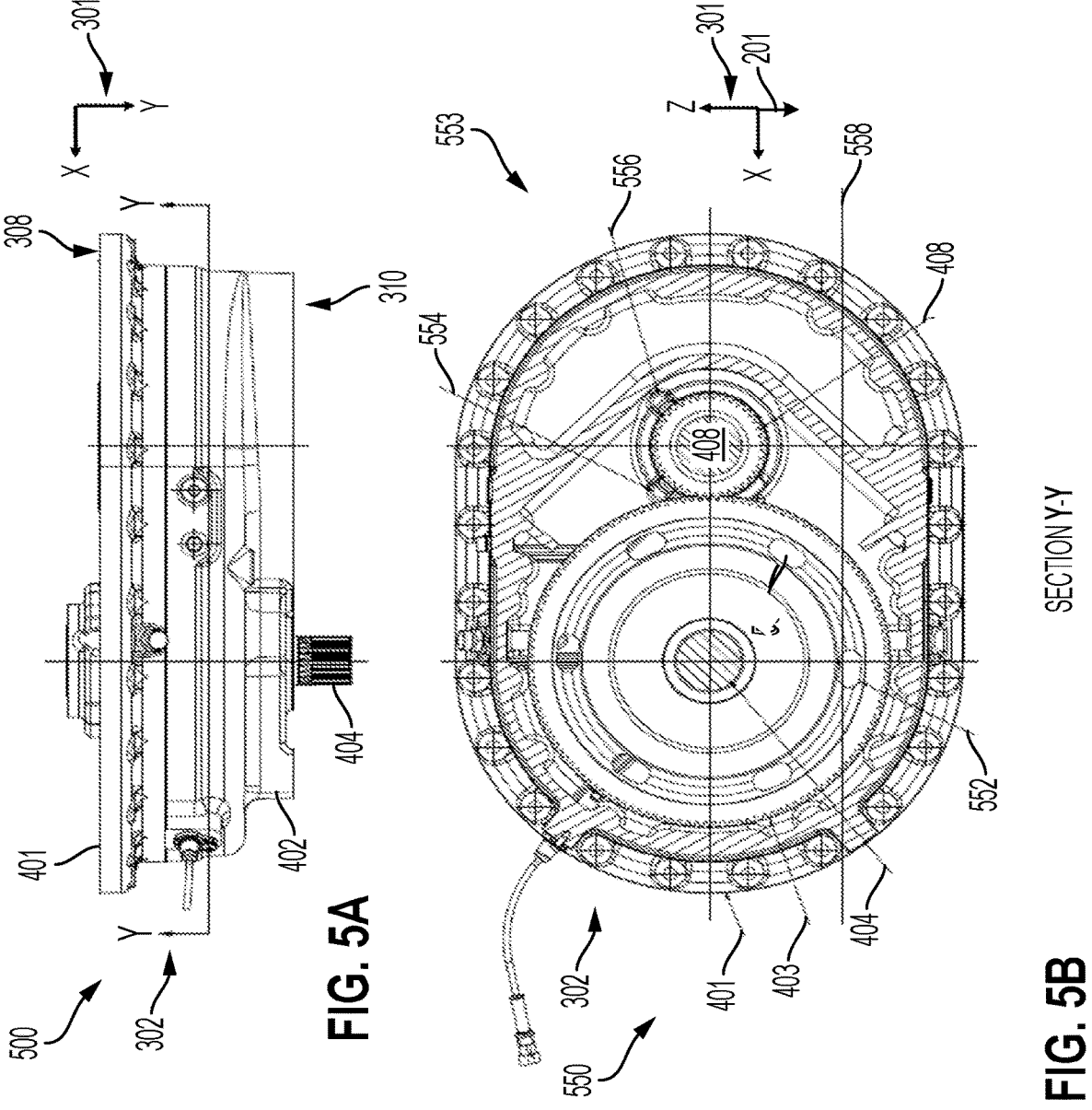
FIG. 5A shows a first side view of the high speed gear box.
FIG. 5B shows a second sectional view of the high speed gear box.

Turning now to FIG. 5A, a first side view 500 of high-speed gear box 302 is shown as viewed along the z axis. A line Y-Y may denote an x-z plane of high-speed gear box 302 bisecting gear box housing 402. A second sectional view 550 of the section of high-speed gear box 302 denoted by line Y-Y looking down the y axis from motor side 310 at high speed gear box cover 401 is shown in FIG. 5B. Output helical gear 403 may include six elliptical holes 552 positioned around a circumference. A number and shape of holes 552 may vary without departing from the scope of this disclosure. In one example, a radial center 560 (e.g., in the x-z plane) of holes 552 may be positioned approximately 132.5 mm from a center of output helical gear 403. Further, six elliptical holes 552 may cover an opening area of approximately 684.2 mm² each. Approximately may herein refer to a range of +/−5%. High speed gear box cover 401 may include a first plurality of oil galleries 553, the first plurality of oil galleries 553 may include an oil gallery "B" 554 and an oil gallery "C" 556. Oil gallery "B" 554 and oil gallery "C" 556 may each be positioned circumferentially surround input pinion shaft 408. As described below with respect to FIGS. 9-12, the first plurality of oil galleries 553 may allow passage of oil from inner walls of high speed gear box 302 to reduction side input ball bearing 413.

As described above, the electric motor may convert electric power to mechanical power thereby rotating input pinion shaft 408. Input pinion shaft 408 may engage with and further rotate output helical gear 403. Output shaft 404 may be coupled to output helical gear 403 and may rotate a second stage planetary assembly. Gears (e.g., input pinion shaft 408 and output helical gear 403) may rotate in both clockwise and counterclockwise directions. As shown in FIG. 5B, lubrication oil level inside high speed gear box 302 may be indicated by line 558. High speed gear box 302 may be mounted inside a vehicle (such as vehicle 100) such that the z axis corresponds to an axis of gravity. In this way, lubrication oil may collect below line 558 thereby forming an oil sump and output helical gear 403 may be partially submerged in the lubrication oil. Output helical gear 403 may rotate in a clockwise or counterclockwise direction, thereby carrying an amount of lubricant oil through the elliptical holes 552 and spreading the lubricant oil over the inner walls of the high speed gear box cover 401 and the high speed gear box housing 402. Excess lubricant oil may accumulate on one side (e.g., motor side 310) of output helical gear 403 and flow to other side (e.g., reduction side 308) of output helical gear 403 though elliptical holes 552. In this way, an amount of oil in the oil sump may be decreased when output helical gear 403 rotates, thereby decreasing resistance to rotation and increasing a mechanical efficiency of high speed gear box 302. Direction of flow (e.g., reduction side 308 to motor side 310 or vice versa) may change depending on if input pinion shaft 408 rotates in a clockwise or counterclockwise direction.

Figure 6:
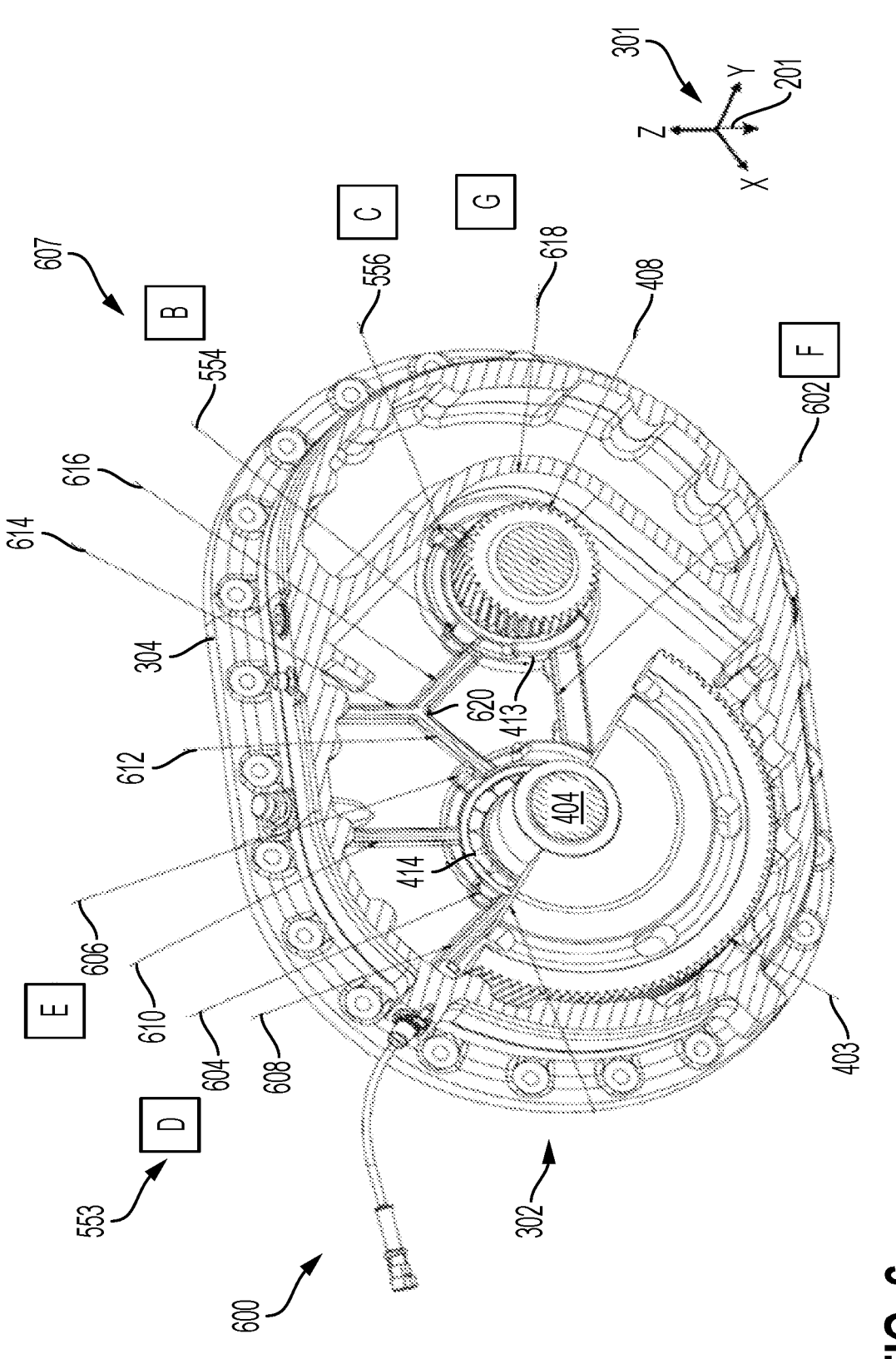
FIG. 6 shows a third sectional view of the high speed gear box.

Turning now to FIG. 6 a third sectional view 600 of high speed gear box 302 is shown. View 600 may also correspond to a section denoted by line Y-Y of FIG. 5A looking at a perspective from motor side 310. Output helical gear 403 is partially omitted to show additional oil galleries of the first plurality of oil galleries 553 and oil retainer features discussed further below. View 600 shows a cover oil retainer feature "F" 602, first plurality of oil galleries 553 including oil gallery "B" 554, oil gallery "C" 556, and further including an oil gallery "D" 604 and an oil gallery "E" 606. In one example, cover oil retain feature "F" 602 may be shaped as a rectangular prism and may extend between output shaft 404 and input pinion shaft 408. Oil gallery "B" 554 and oil gallery "C" 556 may each be positioned circumferentially around reduction side input ball bearing 413. Oil gallery "D" 604 and oil gallery "E" 606 may each be positioned circumferentially around reduction side output ball bearing 414 and may be configured to allow passage of oil from an inner wall of high speed gear box 302 to reduction side output ball bearing 414. In one example oil gallery "B" 554 and oil gallery "C" 556 may each positioned around an upper side of input pinion shaft 408 with respect to the z-axis. Further, oil gallery "D" 604 and oil gallery "E" 606 may be position around an upper side of output shaft 404 with respect to the z-axis.

An interior of high speed gear box cover 401 may include a first plurality of ribs 607, comprising a first rib 608, a second rib 610, a third rib 612, a fourth rib 614, and a fifth rib 616. In one example, the first plurality of ribs 607 may be shaped as rectangular prisms, wherein an inner wall of high speed gear box cover 401 forms a side of the prism. Other prismatic shapes of the plurality ribs have been considered within the scope of the disclosure. The first plurality of ribs 607 may extend a distance from the inner wall. In one example the distance may be between 6 to 8 mm. The above description of first plurality of ribs 607 may also describe a second plurality of ribs 713 describe further below with respect to FIG. 7.

First rib 608, second rib 610 and third rib 612 may each extend radially (e.g., perpendicular to y axis) from reduction side output ball bearing 414. Fifth rib 616 may extend radially from reduction side input ball bearing 413. In some examples, third rib 612, fourth rib 614, and fifth rib 616 may be share a common end 620 and together from a "Y" shape. Further, wall feature "G" 618 may be formed around input pinion shaft 408 connecting top and bottom of an inner wall of high speed gear box cover 401. The first plurality of ribs 607, first plurality of oil galleries 553, cover oil retainer feature "F" 602, and wall feature "G" 618 may each be formed as cast features of the wall (e.g., inner surface) of high speed gear box cover 401. In an alternate example, first plurality of oil galleries 553 may be machined features.

Figure 7:
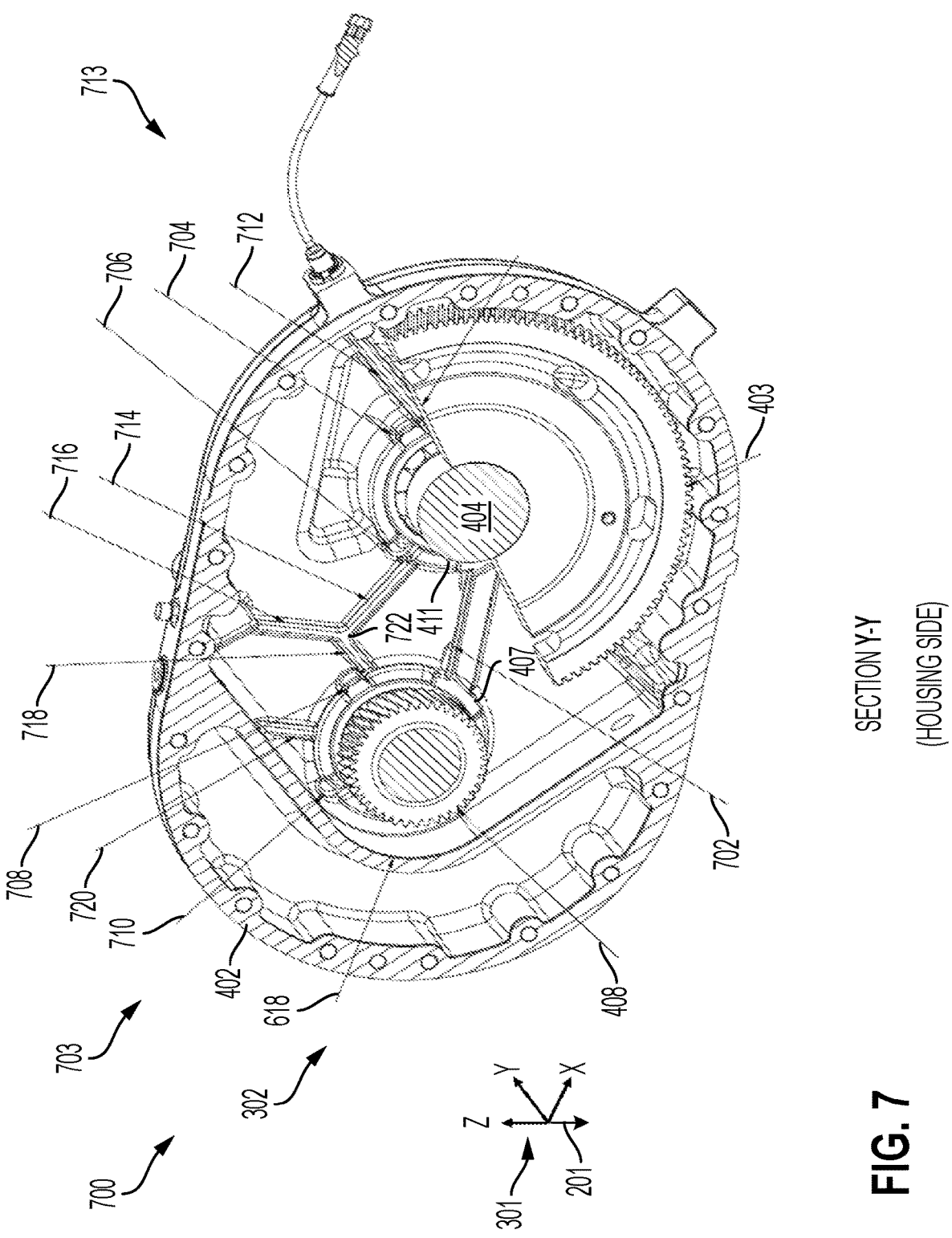
FIG. 7 shows a fourth sectional view of the high speed gear box.

Turning now to FIG. 7 a fourth sectional view 700 of high speed gear box 302 is shown. View 700 may also correspond to a section denoted by line Y-Y of FIG. 5A looking from reduction side 308 at high speed gear box housing 402. View 700 may partially show output helical gear 403 in order to show various oil galleries and oil retainer features. View 700 shows a housing oil retainer feature "L" 702, and a second plurality of oil galleries 703 including an oil gallery "H" 704, an oil gallery "I" 706, an oil gallery "J" 708, and an oil gallery "K" 710. An inner surface of high speed gear box housing 402 may additionally include the second plurality of ribs 713. In one example shown in FIG. 7, the second plurality of ribs may include a sixth rib 712, a seventh rib 714, an eighth rib 716, a ninth rib 718, and a tenth rib 720.

Figure 8B:
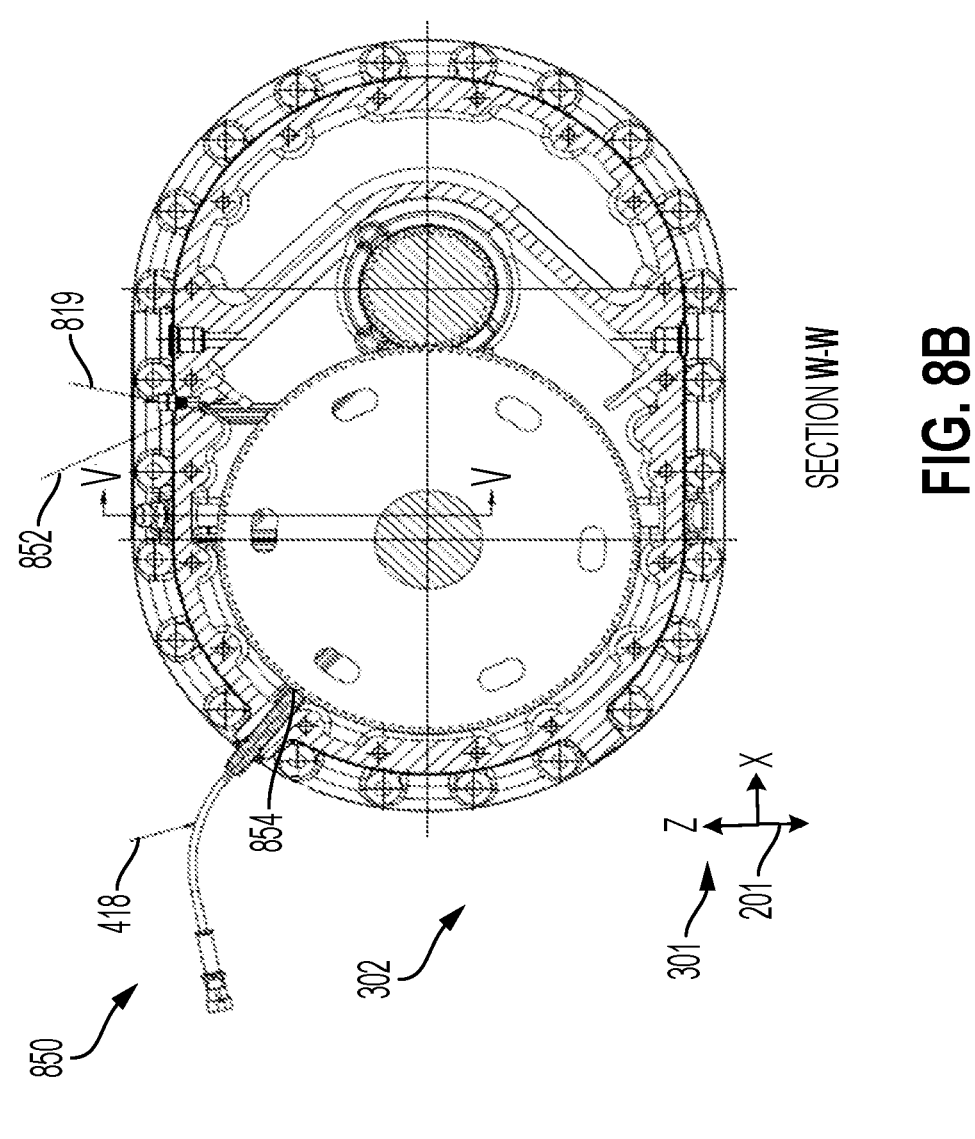
FIG. 8B shows a fifth sectional view of the high speed gear box.
Figure 8A:
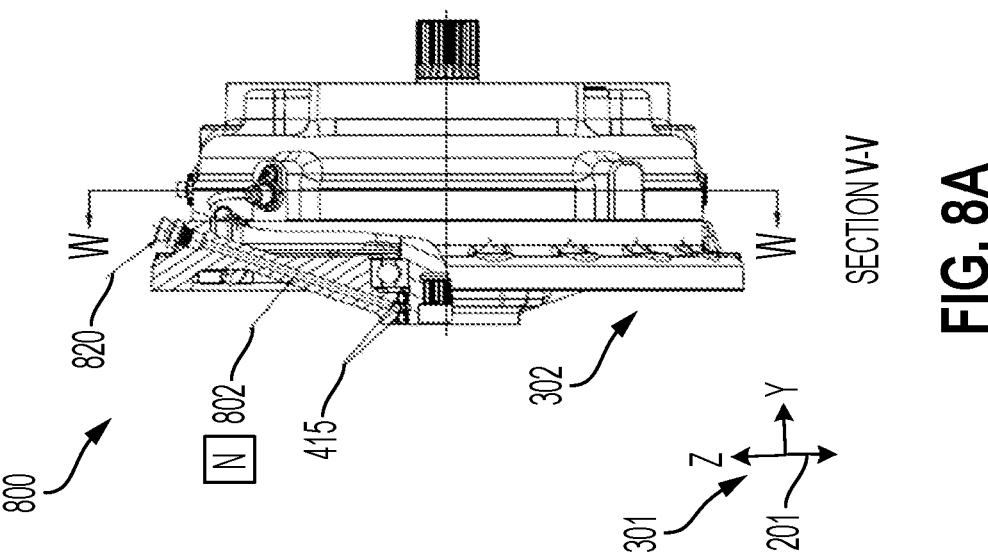
FIG. 8A a second side view of the high speed gear box.

The second plurality of ribs 713 and second plurality of oil galleries 703, and housing oil retainer feature "L" 702 may be formed similarly to the first plurality of ribs and first plurality of oil galleries, but as features on an inner surface of high speed gear box housing 402 instead of high speed gear box cover 401. Housing oil retainer feature "L" 702 may extend between input motor side ball bearing 407 and output motor side ball bearing 411. Further, oil gallery "K" 710 and oil gallery "J" 708 may be positioned circumferentially around a top (with respect to the z-axis) portion of input motor side ball bearing 407. Oil gallery "I" 706 and oil gallery "H" 704 may positioned circumferentially around a top portion of output motor side ball bearing 411. Additionally, tenth rib 720 and ninth rib 718 may extend radially (e.g., perpendicular to the y-axis) from input motor side ball bearing 407 while seventh rib 714 and sixth rib 712 may extend radially from output motor side ball bearing 411. Seventh rib 714, ninth rib 718 and eight rib 716 may each extend towards to share common end 722, together forming a "Y" shape. The second plurality of ribs 713, second plurality of oil galleries 703, housing oil retainer feature "L" 702 may each be formed as cast features of the wall (e.g., inner surface) of high speed gear box housing 402. In an alternate example, second plurality of oil galleries 722 may be machined features, Turning now to FIGS. 8A-8B, a second side view 800 of high speed gear box 302 viewed along the x axis and including line W-W is shown in FIG. 8A. A fifth sectional view 850 of high speed gear box 302 corresponding to a section along line W-W is shown in FIG. 8B. Together, views 800 and 850 show a speed sensor assembly 418, a high pressure breather 419, reduction side output rotary seals 415 may also be referred to as back-to-back dual seal 415, a normal pressure breather 820 and hole feature "N" 802. An eleventh rib 852 may be shown in view 850. Eleventh rib 852 may extend from a side wall of high speed gear box housing 402. Eleventh rib 852 may be inclined to protect entry of lubricant oil into high pressure breather 819. In this way, oil leakage during opening of high pressure breather 819 may be avoided in case high pressure buildup inside high speed gear box 302.

High pressure breather 819 may include a spring arrangement with a pressure threshold of 0.35-0.5 bar. Increase in temperature of lubricant oil may increase internal pressure of high speed gear box 302. When internal pressure of high speed gear box becomes higher than an upper threshold pressure, it may cause opening of lips of rotary seals (e.g., motor side input rotary seal 410 among others) and may result in lubricant oil leakage from high speed gear box 302. High pressure breather 819 may be configured to release pressure if internal pressure exceeds the upper threshold pressure. In one example, the upper threshold pressure may be between 0.35 bar and 0.5 bar. In this way, a sealing system of high speed gear box 302 may be protected.

In some examples a lubricating oil collected inside high speed gear box 302 may be a different grade of lubricating oil from the lubrication oil in a second stage planetary assembly coupled to the reduction side of high speed gear box 302. For this reason, dual seal 415 may be configured to prevent intermixing of oil between high speed gear box 302 and the second stage planetary assembly. Hole feature "N" 802 and normal pressure breather 820 may be configured to maintain atmospheric pressure between an open space within dual seal 415. Temperature may be increased within dual seal 415 during vehicle operation which may cause pressure increase and may lead to lubricant oil leakage from seals, such as reduction side output rotary seals 415. In some examples, reduction side output rotary seals 415 may be dual seals. Hole feature "N" 802 and normal pressure breather 820 may avoid buildup of high pressure within reduction side output rotary seals 415 and may help to maintain a desired operating pressure for proper functioning and preventing premature degradation of seals.

Speed sensor assembly 418 may be mounted on high speed gear box housing 402 with a sensing side 854 positioned above teeth of output helical gear 403. As one example, speed sensor assembly 418 may be a ferromagnetic sensor, configured to provide electrical signals containing information of position and direction of rotation of output helical gear 403. When energized, speed sensor assembly 418, may provide digital information that is representative of the magnetic field around a rotating gear. This information of speed and direction in digital signal form may be input to an electric vehicle control unit such as motor control unit 204 of FIG. 2.

Turning now to FIGS. 17A-19, an alternate embodiment 1702 of high speed gear box 302 is shown. Alternate embodiment 1702 may share features with high speed gear box 302, numbers of such features are the same and will not be reintroduced. Additionally, parts omitted for clarity in FIGS. 17A-19 of may also be the same as those of high speed gear box 302 as described above with respect to FIGS. 1-8.

Figure 17A:
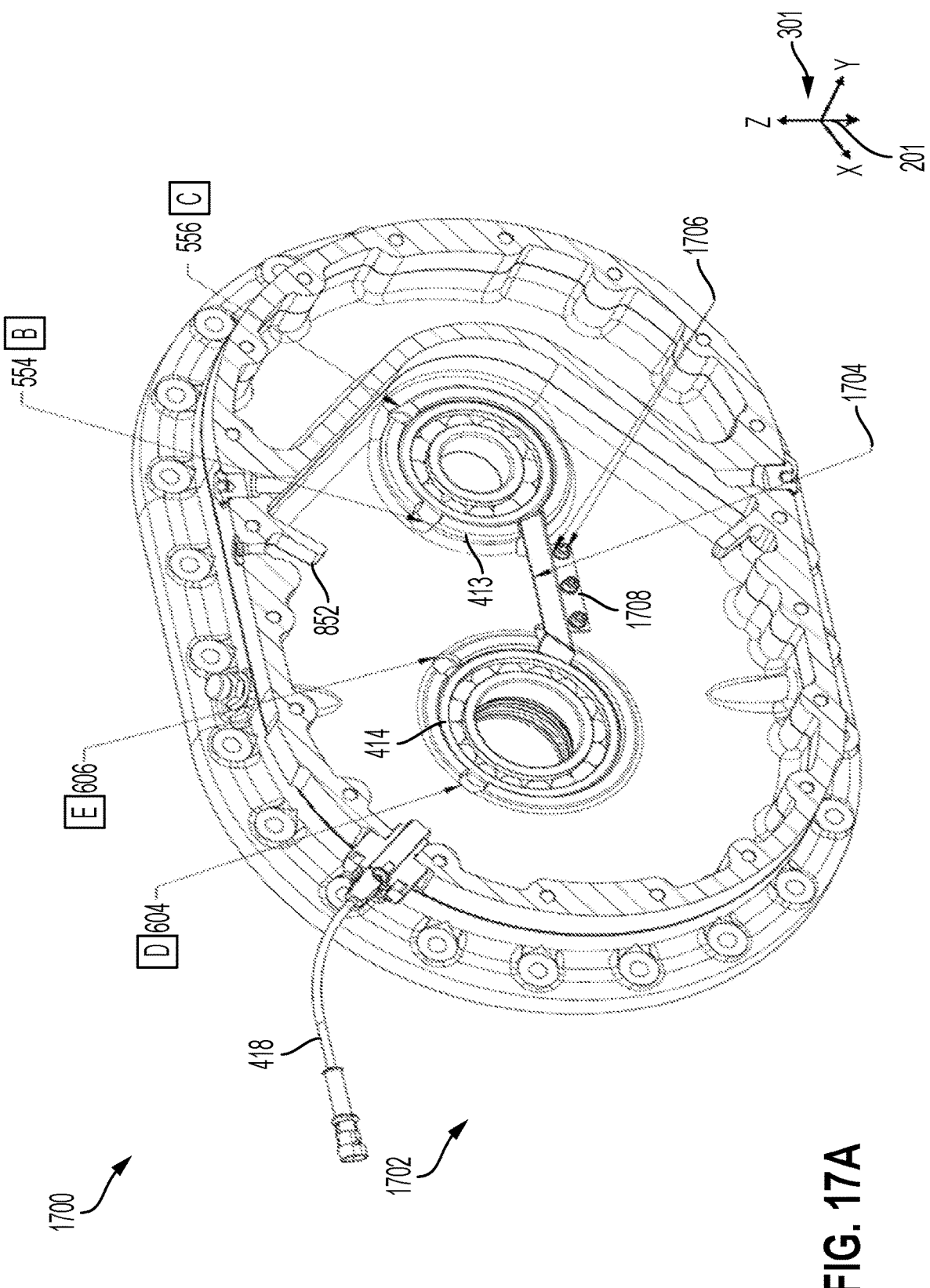
FIG. 17A shows a first sectional view of an alternate embodiment of the high speed gear box including fasteners.

FIG. 17A shows a first sectional view 1700 of alternate embodiment 1702 of high speed gear box 302. First sectional view 1700 may correspond to third sectional view 600 of high speed gear box 302. First sectional view 1700 may omit output helical gear 403 and first plurality of ribs 607 for clarity. Alternate embodiment 1702 includes fabricated cover side oil retainer feature 1704. Fabricated cover side oil retainer feature 1704 may be positioned similarly to cover side oil retainer feature "F" as described above with respect to FIG. 6. A lower flange 1708 may extend vertically, along the z-axis, from a bottom (with respect to gravity as indicated by arrow 201) of fabricated oil retainer feature 1704. Lower flange 1708 may be held in face sharing contact with an inner surface of high speed gear box cover 401 by one or more inner cover fasteners 1706. In one example, the one or more inner cover fasteners 1706 may be three fasteners but other numbers of fasteners have been considered.

Figure 17B:
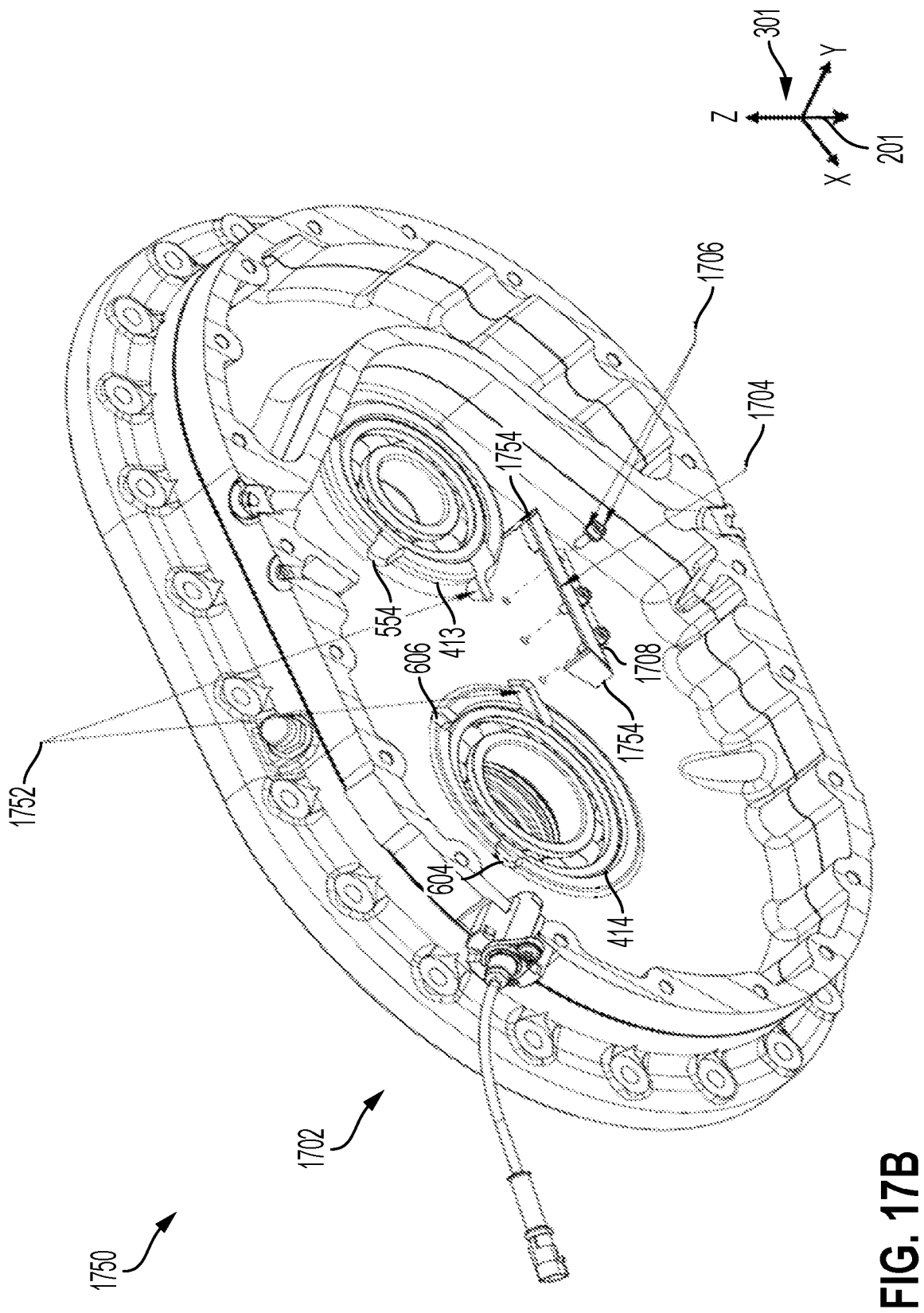
FIG. 17B shows the fourteenth sectional view including an exploded view of the fasteners

FIG. 17B shows an exploded view 1750 of first sectional view 1700. Exploded view 1750 shows side flanges 1754 extending along the y-axis from either side (with respect to the x-axis) of fabricated cover side oil retainer feature 1704. Alternate embodiment 1702 may further include machined slots 1752 positioned in each of reduction side output ball bearing 414 and reduction side input ball bearing 413 and configured to receive side flanges 1754. Machined slots 1752 may be positioned so that fabricated cover side oil retainer feature 1704 in the same place as cover side oil retainer feature "F". In this way, fabricated cover side oil retainer feature may be coupled to high speed gear box cover 401 by one or more inner cover fasteners 1706. When fastened, fabricated oil retainer feature 1704 may be flush to the inner surface of high speed gear box cover 401.

Figure 18A:
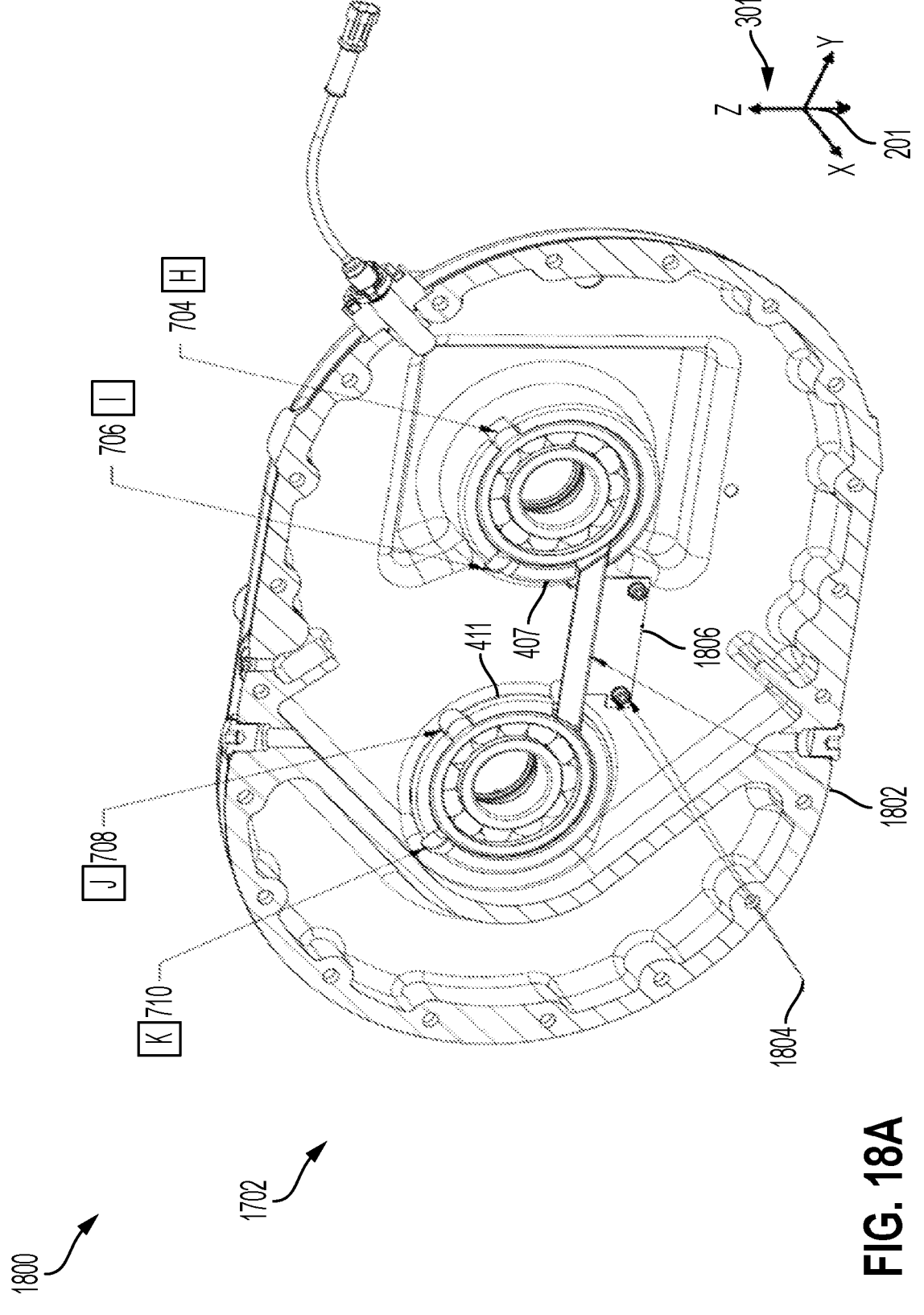
FIG. 18A shows a second sectional view of the alternate embodiment of the high speed gear box.

FIG. 18A shows a second section view 1800 of alternate embodiment 1702 of high speed gear box 302. Second sectional view 1800 may correspond to fourth sectional view 700 of high speed gear box 302. Second sectional view 1800 may omit output helical gear 403 and second plurality of ribs 713 for clarity. Alternate embodiment 1702 includes fabricated housing side oil retainer feature 1802. Fabricated housing side oil retainer feature 1802 may be positioned similarly to housing side oil retainer feature "L" as described above with respect to FIG. 7. A lower flange 1806 may extend vertically, along the z-axis, from a bottom (with respect to gravity as indicated by arrow 201) of fabricated housing side oil retainer feature 1802. Lower flange 1806 may be held in face sharing contact with an inner surface of high speed gear box housing 402 by one or more inner housing fasteners 1804. In one example the one or more fasteners 1704 may be two fasteners but other numbers of fasteners have been considered.

Figure 18B:
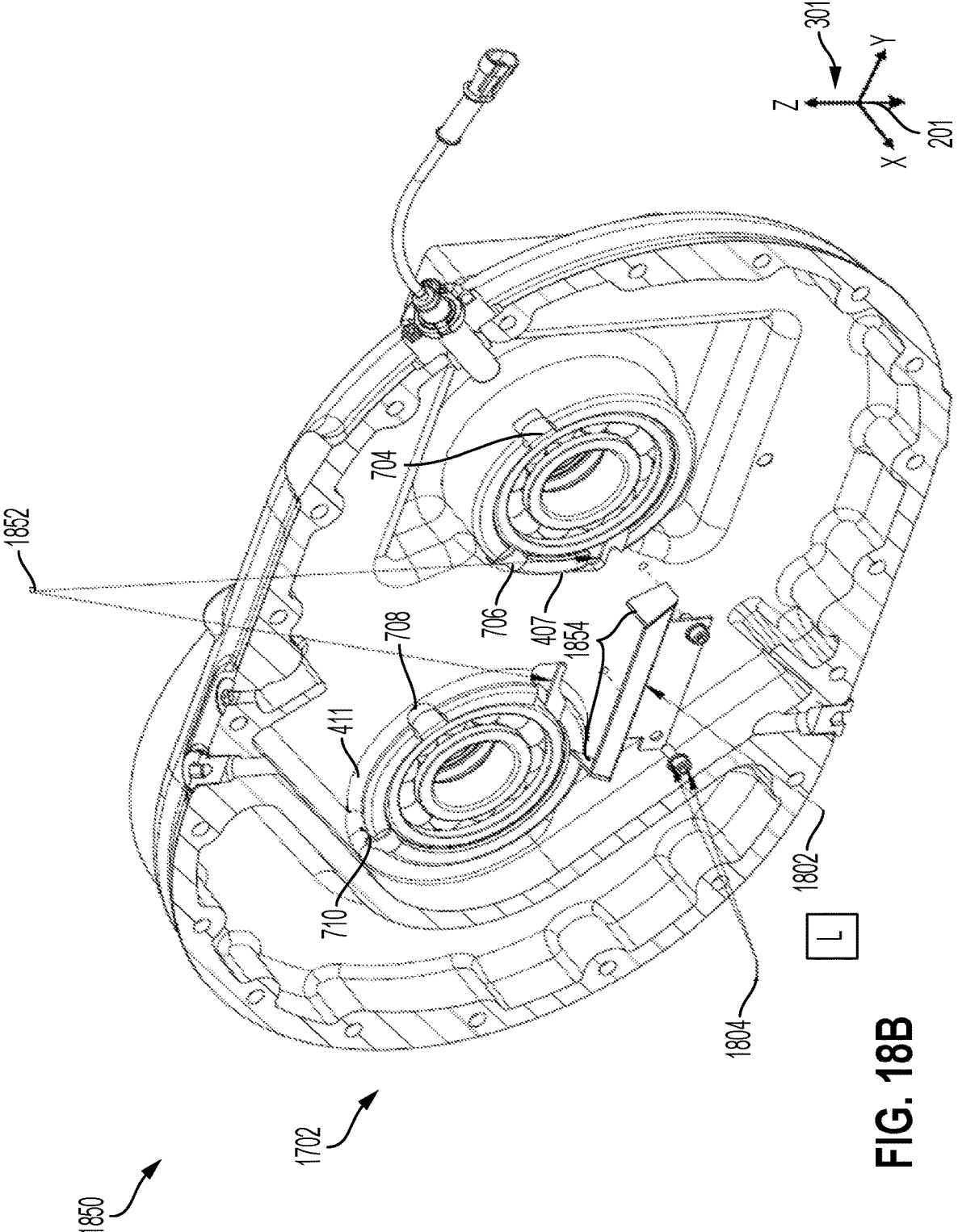
FIG. 18B shows the second sectional view of the high speed gear box including an exploded view of fasteners.

FIG. 18B shows an exploded view 1850 of second sectional view 1800. Exploded view 1850 shows side flanges 1854 extending along the y-axis from either side (with respect to the x-axis) of fabricated housing side oil retainer feature 1802. Alternate embodiment 1702 may further include machined slots 1852 positioned in each of motor side input ball bearing 411 and motor side output ball bearing 407 and configured to receiver side flanges 1854. Machined slots 1852 may be positioned so that fabricated housing side oil retainer feature 1802 is held in the same place is housing side oil retainer feature "L". In this way, fabricated housing side oil retainer feature 1802 may be coupled to high speed gear box housing 402 by one or more inner housing fasteners 1804. When fastened, fabricated housing side oil retainer feature 1802 may be flush to the inner surface of high speed gear box housing 402.

Figure 19:
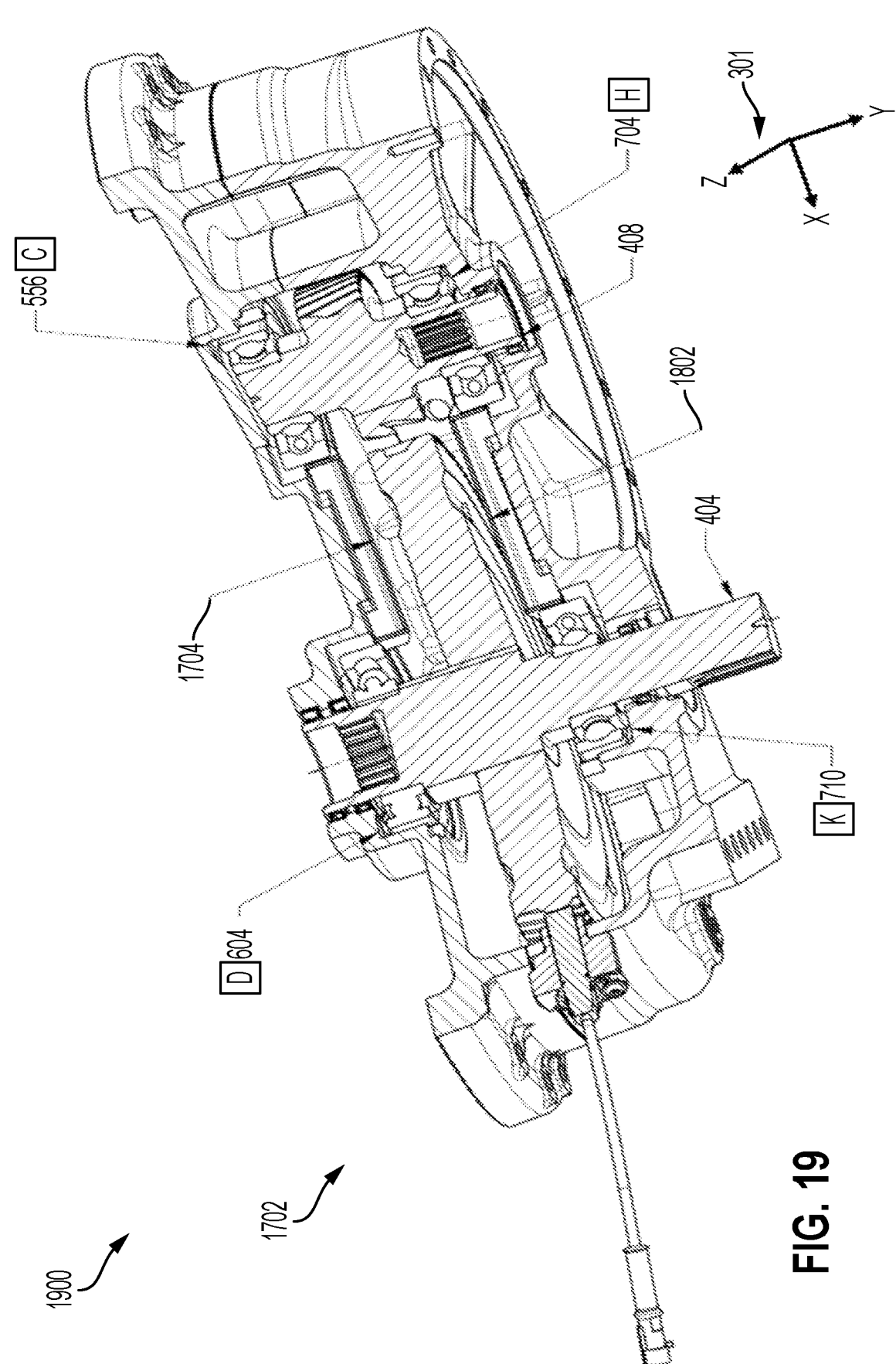
FIG. 19 shows a third sectional view of the alternate embodiment of the high speed gear box.

Turning now to FIG. 19, a third sectional view 1900 of alternate embodiment 1702 is shown. Third sectional view 1900 shows alternate embodiment 1702 including both a cover side and housing side including both fabricated cover side oil retainer feature 1704 and fabricated housing side oil retainer feature 1802. Fabricated cover side oil retainer feature 1704 may be positioned opposite from fabricated housing side oil retainer feature 1802 across the z-axis.

Figure 9:
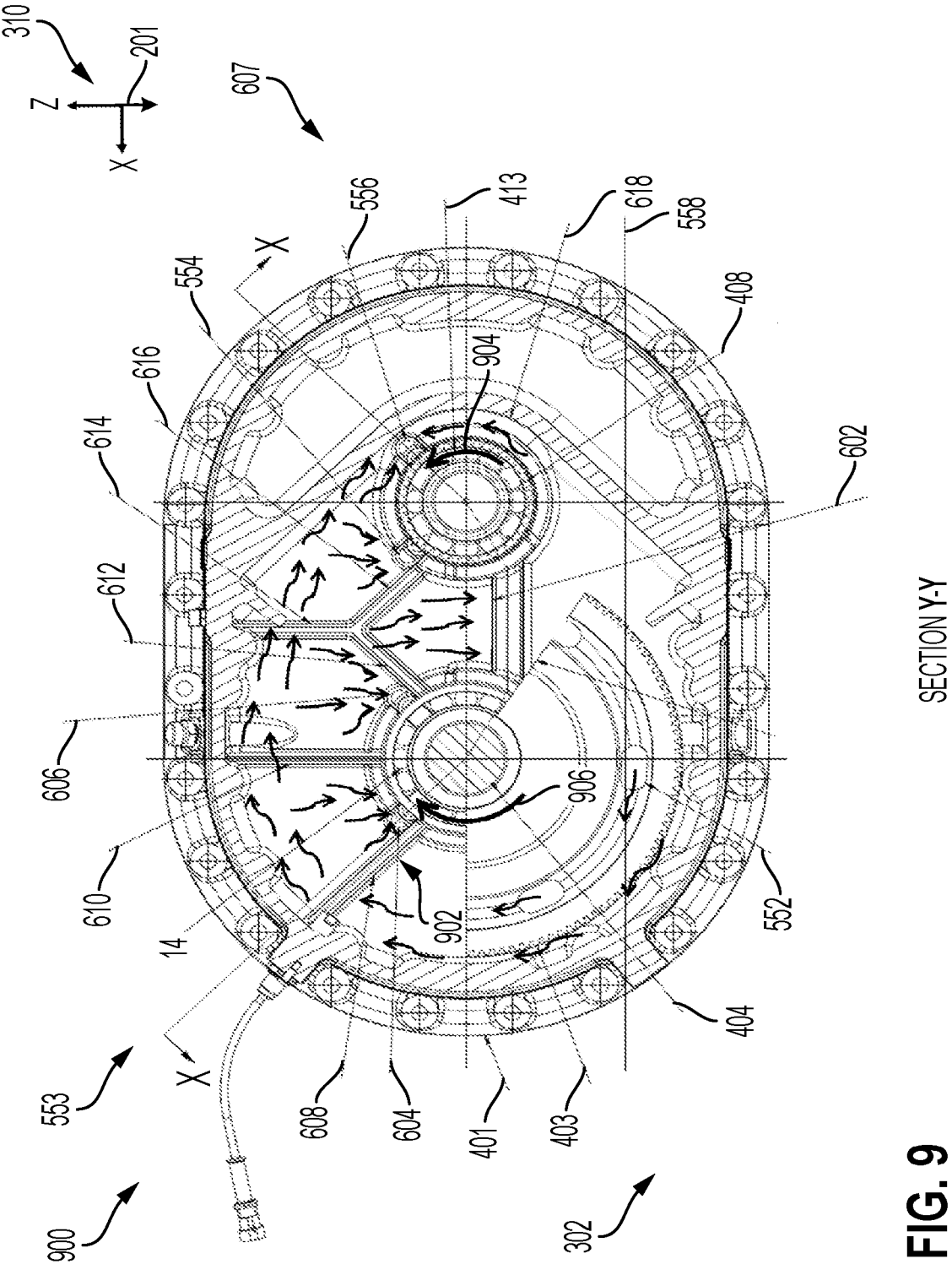
FIG. 9 shows a sixth sectional view of the high speed gear box including lubricant oil flow during counterclockwise movement of an input pinion shaft

Turning now to FIG. 9, a sixth sectional view 900 is shown. View 900 may be of a section corresponding to line Y-Y of FIG. 5A, viewed from motor side 310. View 900 may partially omit output helical gear 403. View 900 may include a plurality of arrows 902 indicating lubricant oil flow inside high speed gear box 302 during counterclockwise movement of input pinion shaft 408 when viewed from motor side 310, as indicated by arrow 904. Counterclockwise rotation of input pinion shaft 408 may cause clockwise rotation of output helical gear 403 as indicated by arrow 906. As output helical gear 403 rotates, elliptical holes 552 may take oil along while output helical gear 403 rotates and distribute the lubricant oil on both sides of output helical gear 403. A crest portion of teeth of output helical gear 403 and input pinion shaft 408 may carry lubricant oil and deliver lubricant oil to features of high speed gear box by splashing lubricant oil inside a void space of high speed gear box 302.

A first portion of lubricant oil may fall between first rib 608 and second rib 610 and may collectively enter inside oil gallery "D" 604. From inside oil gallery "D 604, the first portion of lubricant oil may be transferred behind reduction side output ball bearing 414 as shown by the plurality of arrows 902. A second portion of lubricant may fall in between second rib 610 and third rib 612 and/or fourth rib 614. The second portion of lubricant oil may collectively enter inside gallery "E" 606. From inside oil gallery "E" 606, the second portion of lubricant oil may be transferred behind reduction side output ball bearing 414. A third portion of lubricant oil may fall between curve shape casting wall feature "G" 618 and fourth rib 614 and/or fifth rib 616. The third portion of lubricant oil may collectively enter inside gallery "B" 554 and oil gallery "C" 556. From inside oil gallery "B" 554 and oil gallery "C" 556, the third portion of lubricant oil may be transferred behind reduction side input ball bearing 413 as shown by plurality of arrows 902. Said another way, lubricant oil may pass through reduction side input ball bearing 413. A fourth portion of lubricant oil may fall on cover oil retainer feature "F" 602. The fourth portion of lubricant oil may be accumulated inside cover oil retainer feature "F" 602 and may thereby be distributed to reduction side output ball bearing 414 and reduction side input ball bearing 413.

The first, second, third and fourth portions of lubricant oil from all oil galleries "B" 554, "C" 556, "D" 604, "E" 606 and cover oil retainer feature "F" 602 may flow through (e.g., be passed through) balls of reduction side input ball bearing 413 and reduction side output ball bearing 414 and may return back to an oil sump (e.g., oil collected in high speed gear box 302 below lubrication oil level line 558). This process may repeat continually as wheels of the vehicle rotate. In this way, lubricant oil may be circulated through input reduction side ball bearing 413 and output reduction side ball bearing 414 during operation of high speed gear box 302. Further, lubricant oil may contact inner walls of high speed gear box 302, thereby dissipating heat accumulated in the lubricant oil to the inner walls which are passively cooled.

Figure 10:
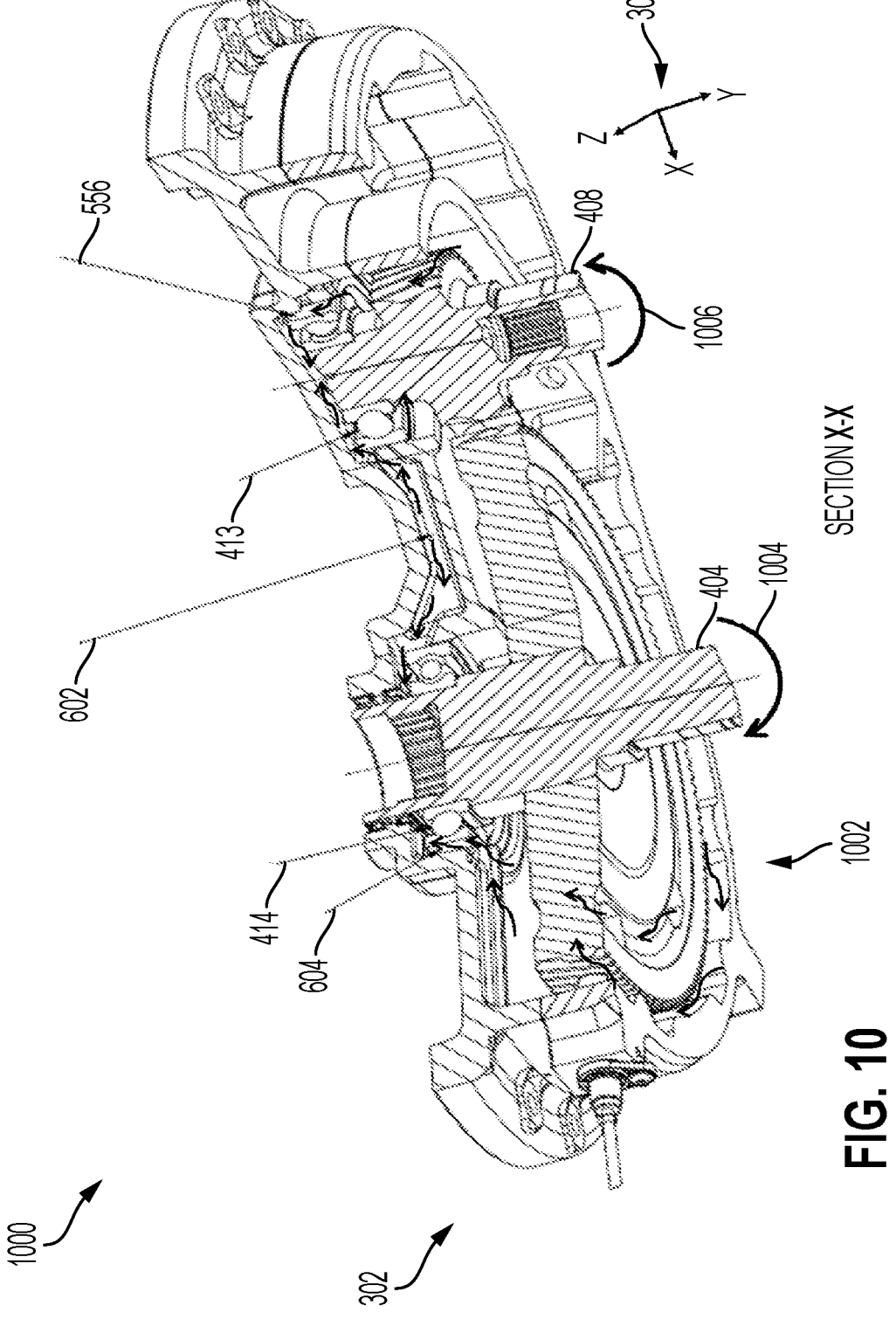
FIG. 10 shows a seventh sectional view of the high speed gear box including lubrication flow during counterclockwise movement of the input pinion shaft.

FIG. 10 shows a seventh sectional view 1000 through oil gallery "B" 554, cover oil retainer feature "F" 602 and oil gallery "E" 606. Seventh sectional view 1000 may correspond to section taken along line X-X shown in FIG. 9. A second plurality of arrows 1002 may show a direction of lubricant oil flow to reduction output bearing 414 and reduction input bearing 413 during counter clockwise movement of input pinion shaft 408 (indicated by arrow 1006) and clockwise movement of output shaft 404 indicated by arrow 1004.

Figure 11:
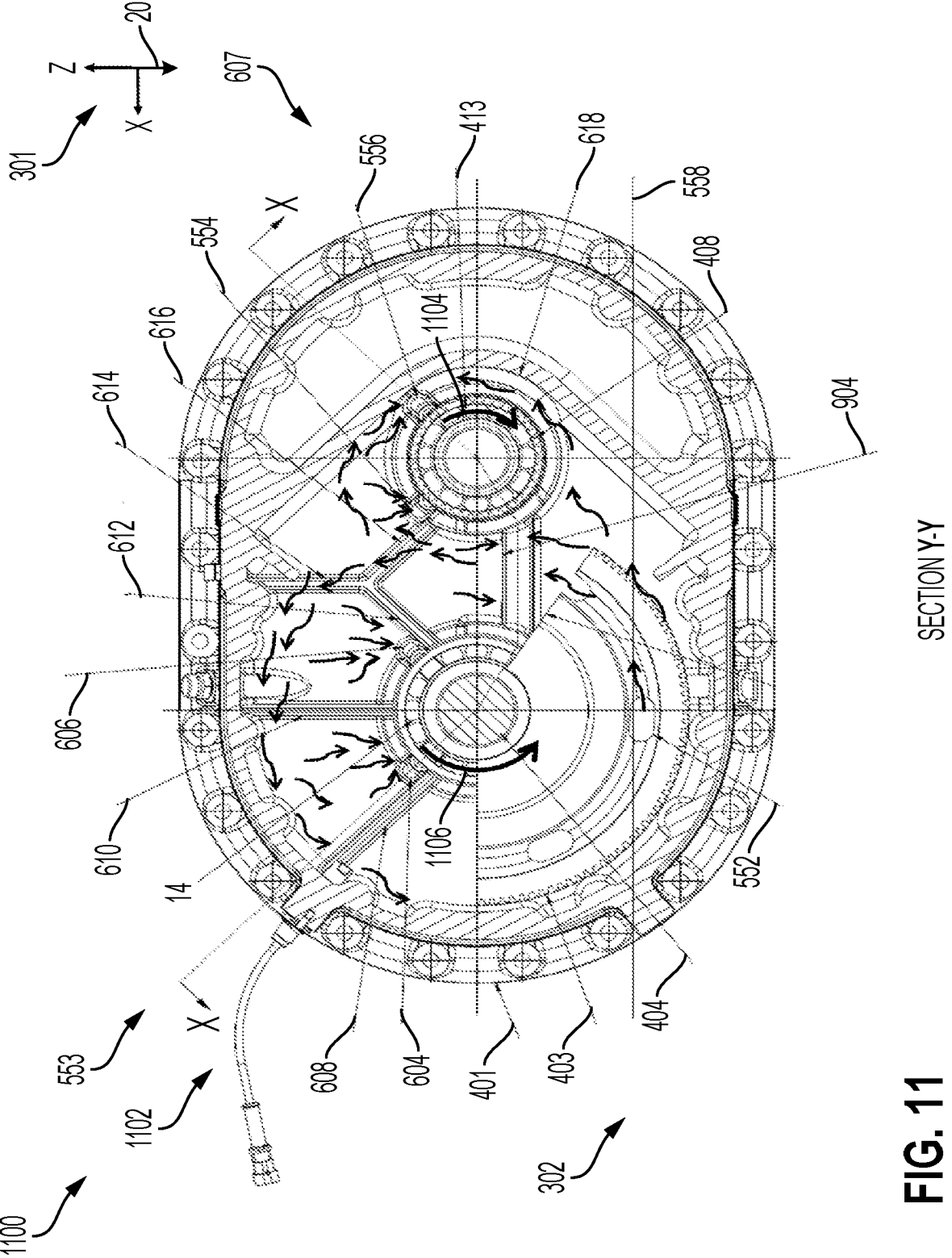
FIG. 11 shows an eighth sectional view of the high speed gear box including lubrication flow during clockwise movement of the input pinion shaft

Turning now to FIG. 11, an eighth sectional view 1100 of high speed gear box 302. View 1100 may be the same as view 900, but may include a second plurality of arrow 1102 showing lubricant oil flow inside high speed gear box 302 during clockwise movement, indicated by arrow 1104, of input pinion shaft 408 when viewed from motor side 310. Clockwise rotation of input pinion shaft 408 may cause counterclockwise rotation of output helical gear 403, indicated by arrow 1106. As output helical gear 403 rotates, elliptical holes 552 take oil along while output helical gear 403 rotates and distributes lubricant oil on both sides. A crest portion of teeth of output helical gear 403 and input pinion shaft 408 may carry lubricant oil and deliver lubricant oil to features of high speed gear box by splashing lubricant oil inside a void space of high speed gear box 302. A first portion of lubricant may fall between first rib 608 and second rib 610 and may collectively enter oil gallery "D" 604. The first portion of lubricant oil may be transferred from oil gallery "D" 604 to behind reduction output ball bearing 414. A second portion of lubricant oil may fall between second rib 610 and third rib 612 and/or fourth rib 614. The second portion of lubricant oil may collectively enter inside oil gallery "E" 606 and may then be transferred to behind reduction output ball bearing 414. A third portion of lubricant oil may fall in between curve shape casting wall feature "G" 618 and fourth rib 614 and/or fifth rib 616. The third portion of lubricant oil may collectively enter inside oil gallery "B" 554 and oil gallery "C" 556 and may then be transferred to behind reduction input ball bearing 413. A fourth portion of lubricant oil may fall on oil retainer feature "F" 904 and may be accumulated inside cover oil retainer feature "F" 602 and be subsequently distributed to both reduction output ball bearing 414 and reduction input ball bearing 413. The first, second, third, and fourth portions of lubricant oil from oil gallery "B" 554, oil gallery "C" 556, oil gallery "D" 604, oil gallery "E" 606 and cover oil retainer feature "F" 602 may flow through balls of reduction input and output ball bearing 413 and 414 and subsequently be collected in the oil sump. This process may repeat continually as wheels of the vehicle rotate. In this way, lubricant oil may be circulated through input and output reduction side ball bearing 413 and 414 during operation of high speed gear box 302. Additionally, the lubricant oil may contact and transfer heat to inner walls of high speed gear box 302.

Figure 12:
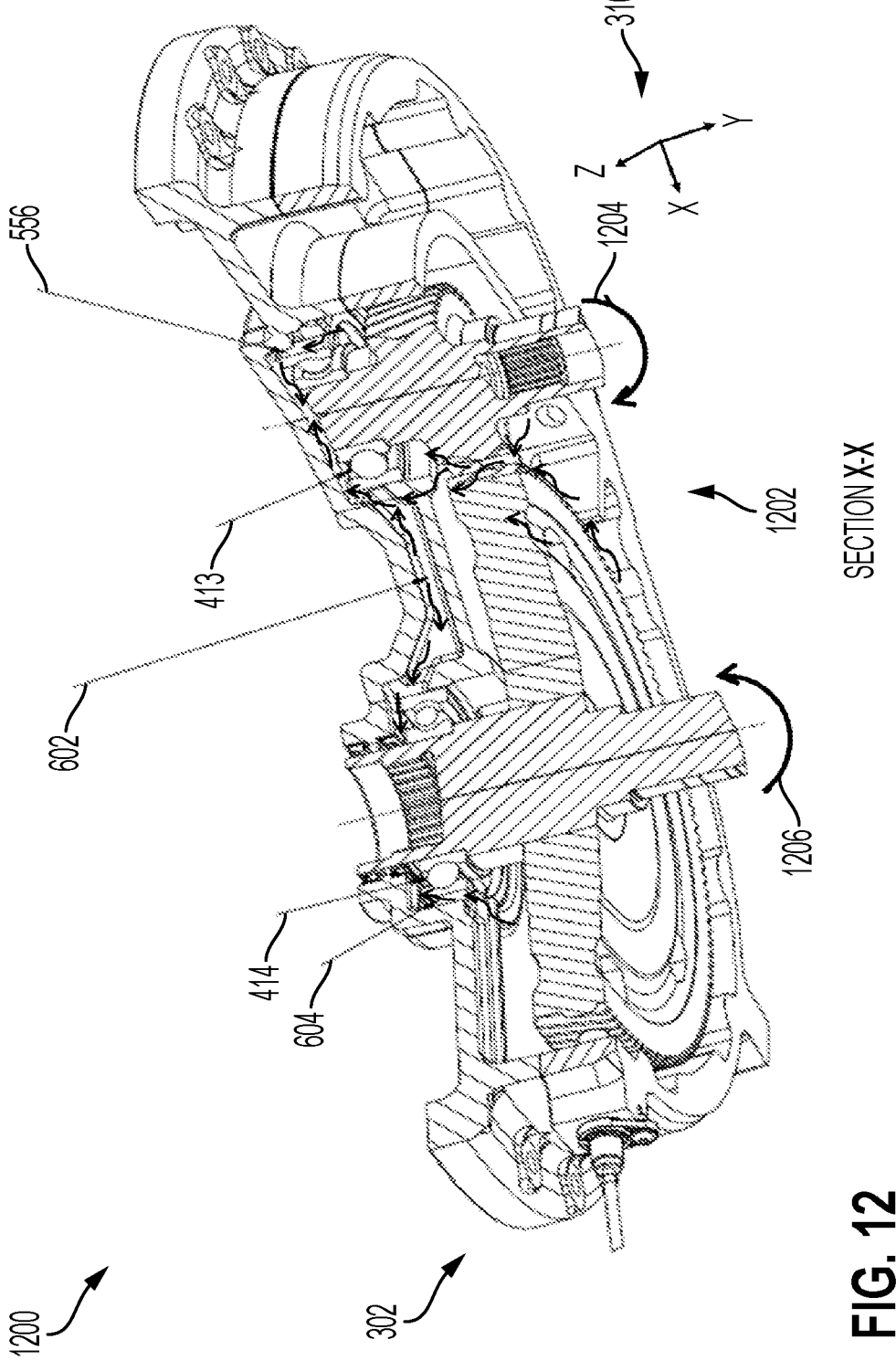
FIG. 12 shows a ninth sectional view of the high speed gear box including lubrication flow during clockwise movement of the input pinion shaft.

FIG. 12 shows a ninth sectional view 1200 through oil gallery "C" 556, cover oil retainer feature "F" 602 and oil gallery "D" 604. View 1200 may be of a section corresponding to line X-X of FIG. 11. A fourth plurality of arrows 1202 shows direction of lubricant oil flow to reduction output bearing 414 and reduction input bearing 413 during clockwise rotation of input pinion shaft 408, indicated by arrow 1204, and counter clockwise rotation of output shaft 404, indicated by arrow 1206. In some examples, cover oil retainer feature "F" 602 may be replaced with fabricated cover oil retainer feature 1704 as described above with respect FIGS. 17A-B and FIG. 19 without affecting flow of oil as described with respect to FIGS. 9-12.

Figure 13:
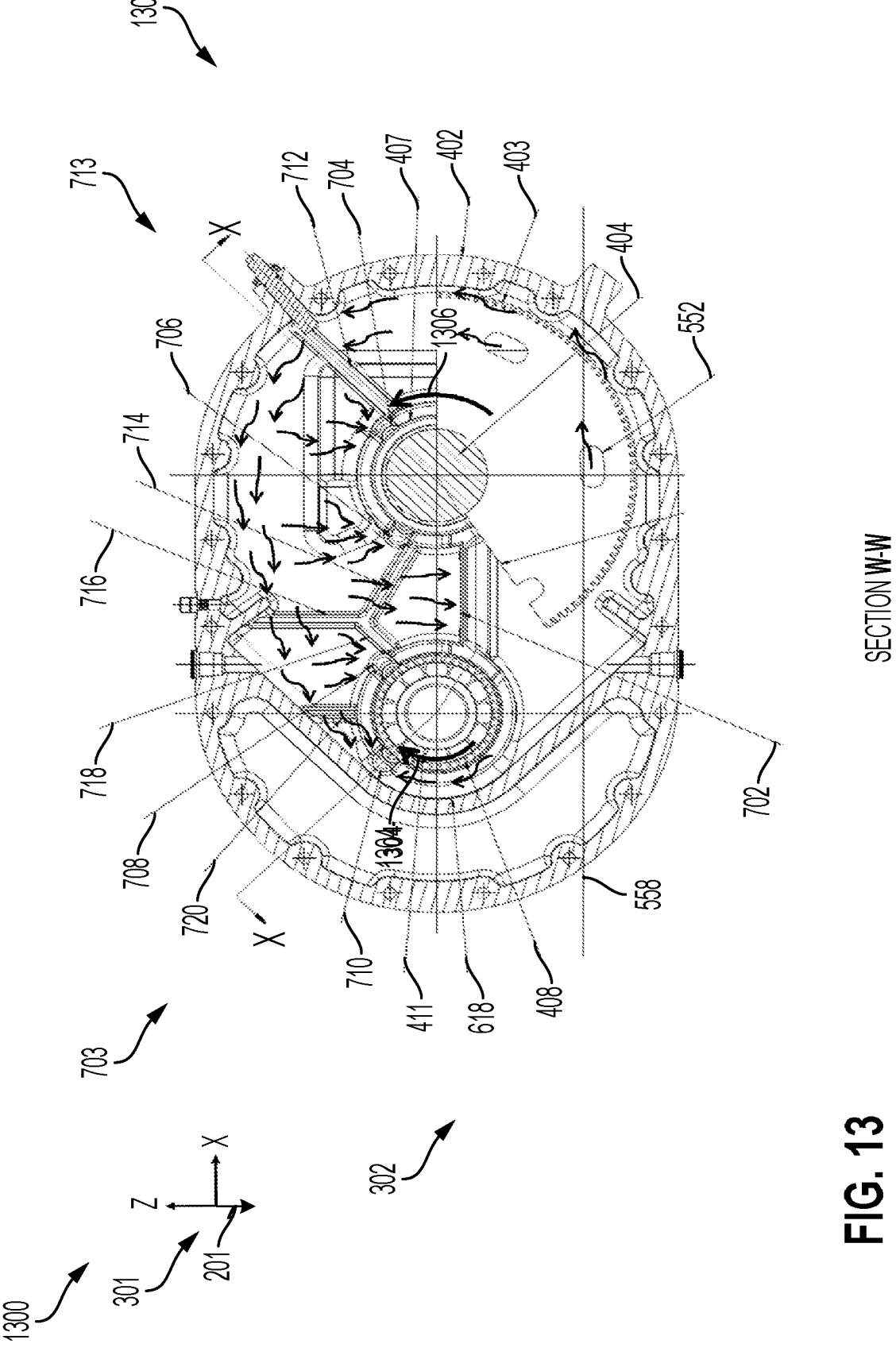
FIG. 13 shows a tenth sectional view of the high speed gear box including lubrication flow during counterclockwise movement of the input pinion shaft.

Turning now to FIG. 13, a tenth sectional view 1300 is shown. View 1300 may be of a section corresponding to line W-W of FIG. 8A, viewed from reduction side 308. View 1300 may partially omit output helical gear 403. View 1300 may include a plurality of arrows 1302 indicating lubricant oil flow inside high speed gear box 302 during counter-clockwise movement of input pinion shaft 408, indicated by arrow 1304 when viewed from motor side 310. Counter-clockwise rotation of input pinion shaft 408 may cause clockwise rotation of output helical gear 403, as indicated by arrow 1306. As output helical gear 403 rotates, elliptical holes 552 may take lubricant oil along while output helical gear 403 rotates and distributes it on both sides of output helical gear 403. A crest portion of teeth of output helical gear 403 and input pinion shaft 408 may carry lubricant oil and deliver lubricant oil to features of high speed gear box by splashing lubricant oil inside a void space of high speed gear box 302. A first portion of lubricant oil may fall between sixth rib 712 and eighth rib 716 and/or seventh rib 714 and may subsequently collectively enter inside oil gallery "H" 704 and oil gallery "I" 706. The first portion of lubricant oil may then be transferred to behind motor side output ball bearing 407. A second portion of lubricant oil may fall between eighth rib 716 and/or ninth rib 718 and tenth rib 720 and may subsequently collectively enter inside gallery "J" 708. The second portion of lubricant oil may then be transferred to behind motor side input ball bearing 411. A third portion of lubricant oil may fall in between curved shape casting wall feature "G" 618 and tenth rib 720 and may subsequently collectively enter inside oil gallery "K" 710. The third portion may then be transferred to behind motor side input ball bearing 411. A fourth portion of lubricant may fall on housing oil retainer feature "L" 702 and may accumulate inside housing oil retainer feature "L" 702. The fourth portion of lubricant oil may then be distributed to both motor side input ball bearing 411 and motor side output ball bearing 407. The first, second, third and fourth portions of lubricant oil from oil gallery "H" 704, oil gallery "I" 706, oil gallery "J" 708, oil gallery "K" 710 and housing oil retainer feature "L" 702 may flow through balls of motor side output ball bearing 407 and motor side input ball bearing 411 and may subsequently enter back to the oil sump. This process may repeat continually as wheels of the vehicle rotate. In this way, lubricant oil may be circulated through and received by output motor side bearing 411 and input motor side output ball bearing 407 during operation of high speed gear box 302.

Figure 14:
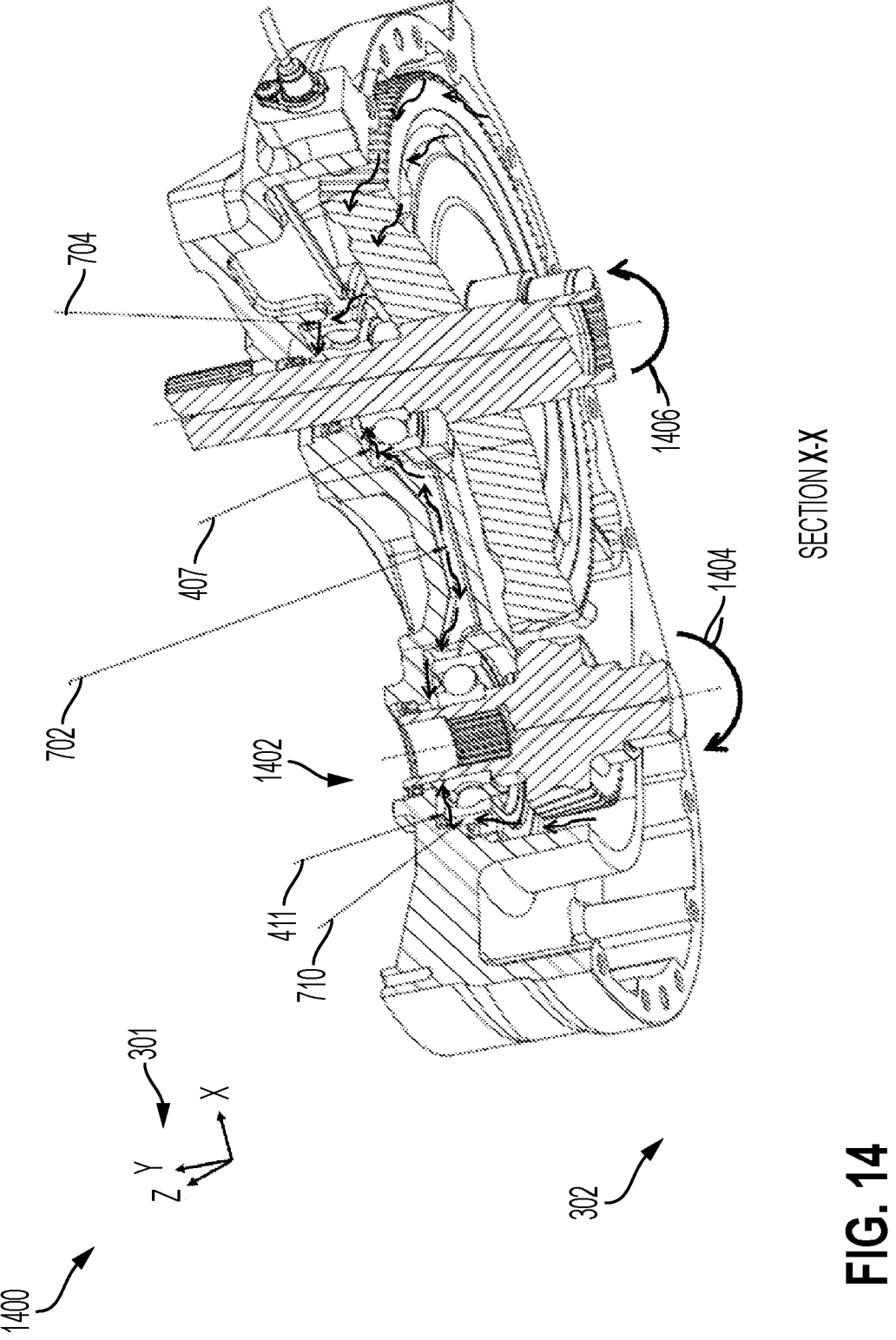
FIG. 14 shows an eleventh sectional view of the high speed gear box including lubrication flow during counterclockwise movement of the input pinion shaft.

FIG. 14 shows an eleventh sectional view 1400 through oil gallery "H" 704, housing oil retainer feature "L" 702 and oil gallery "K" 710. View 1400 may correspond to a section taken along line X-X of FIG. 13. A plurality of arrows 1402 may indicate a direction of lubricant oil flow to motor side output ball bearing 407 and motor side input ball bearing 411 during counter clockwise rotation of input pinion shaft 408, as indicated by arrow 1404 and clockwise rotation of output shaft 404 as indicated by arrow 1406.

Figure 15:
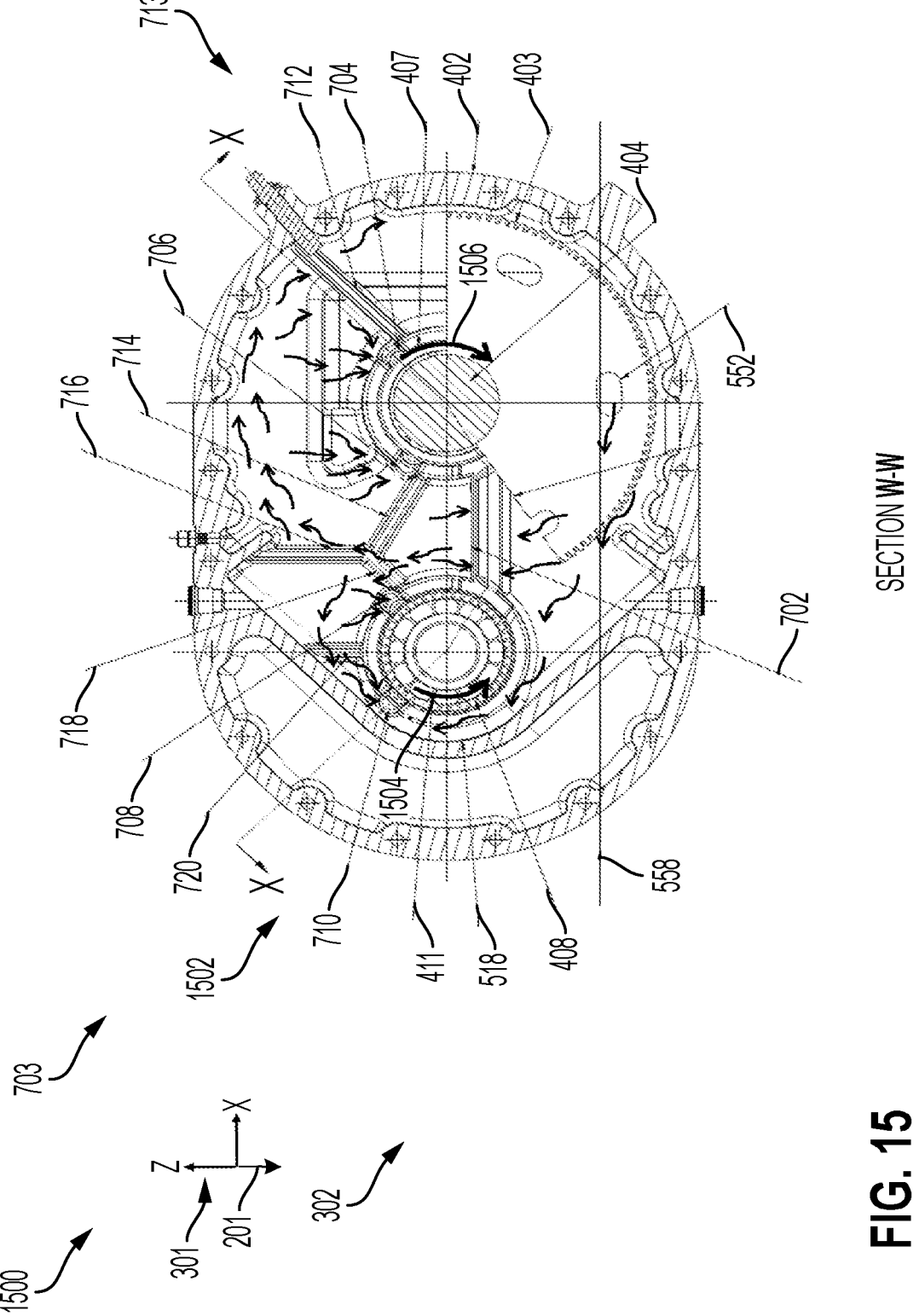
FIG. 15 shows a twelfth sectional view of the high speed gear box including lubrication flow during clockwise movement of the input pinion shaft.

Turning now to FIG. 15, a twelfth sectional view 1500 of high speed gear box 302 is shown. View 1500 may be the same as view 1300, but may include a plurality of arrows 1502 showing lubricant oil flow inside high speed gear box 302 during clockwise movement of input pinion shaft 408, as shown by arrow 1504, when viewed from motor side 310. Clockwise rotation of input pinion shaft 408 may cause counterclockwise rotation of output helical gear 403, as indicated by arrow 1506. As output helical gear 403 rotates, elliptical holes "A" 552 may take lubricant oil along while output helical gear 403 rotates and distributes lubricant oil on both sides output helical gear 403. A crest portion of teeth of output helical gear 403 and input pinion shaft 408 may carry lubricant oil and deliver lubricant oil to features of high speed gear box by splashing lubricant oil inside a void space of high speed gear box 302. A first portion of lubricant oil may fall between sixth rib 712 and eighth rib 716 and/or seventh rib 714 and may subsequently collectively enter inside oil gallery "H" 704 and oil gallery "I" 706. The first portion may then be transferred to behind motor side output ball bearing 407. A second portion of lubricant may fall between eighth rib 716 and/or ninth rib 718 and tenth rib 720 and may subsequently collectively enter inside oil gallery "J" 708. The second portion of lubricant oil may then be transferred to behind motor side input ball bearing 411. A third portion of lubricant may fall between curve shape casting wall feature "G" 518 and tenth rib 720 and may subsequently collectively enter inside oil gallery "K" 710. The third portion may then be transferred to behind motor side input ball bearing 411. A fourth portion of lubricant oil may fall on oil retainer feature "L" 702 and may accumulate inside housing oil retainer feature "L" 702. The fourth portion of lubricant oil may then be distributed to both motor side output ball bearing 407 and motor side input ball bearing 411. The first, second, third, and fourth portions of lubricant oil from oil gallery "H" 704, oil gallery "I" 706, oil gallery "J" 708, oil gallery "K" 710 and housing oil retainer feature "L" 702 may flow through balls of motor side output ball bearing 407 and motor side input ball bearing 411 and may then return to oil sump. This process may repeat continually as wheels of the vehicle rotate. In this way, lubricant oil may be circulated through and received by motor side output ball bearing 407 and motors side input ball bearing 411 during operation of high speed gear box 302. Additionally, lubricant oil may contact and dissipate heat to an inner wall of high speed gear box 302 when lubricant oil is circulated in this manner.

Figure 16:
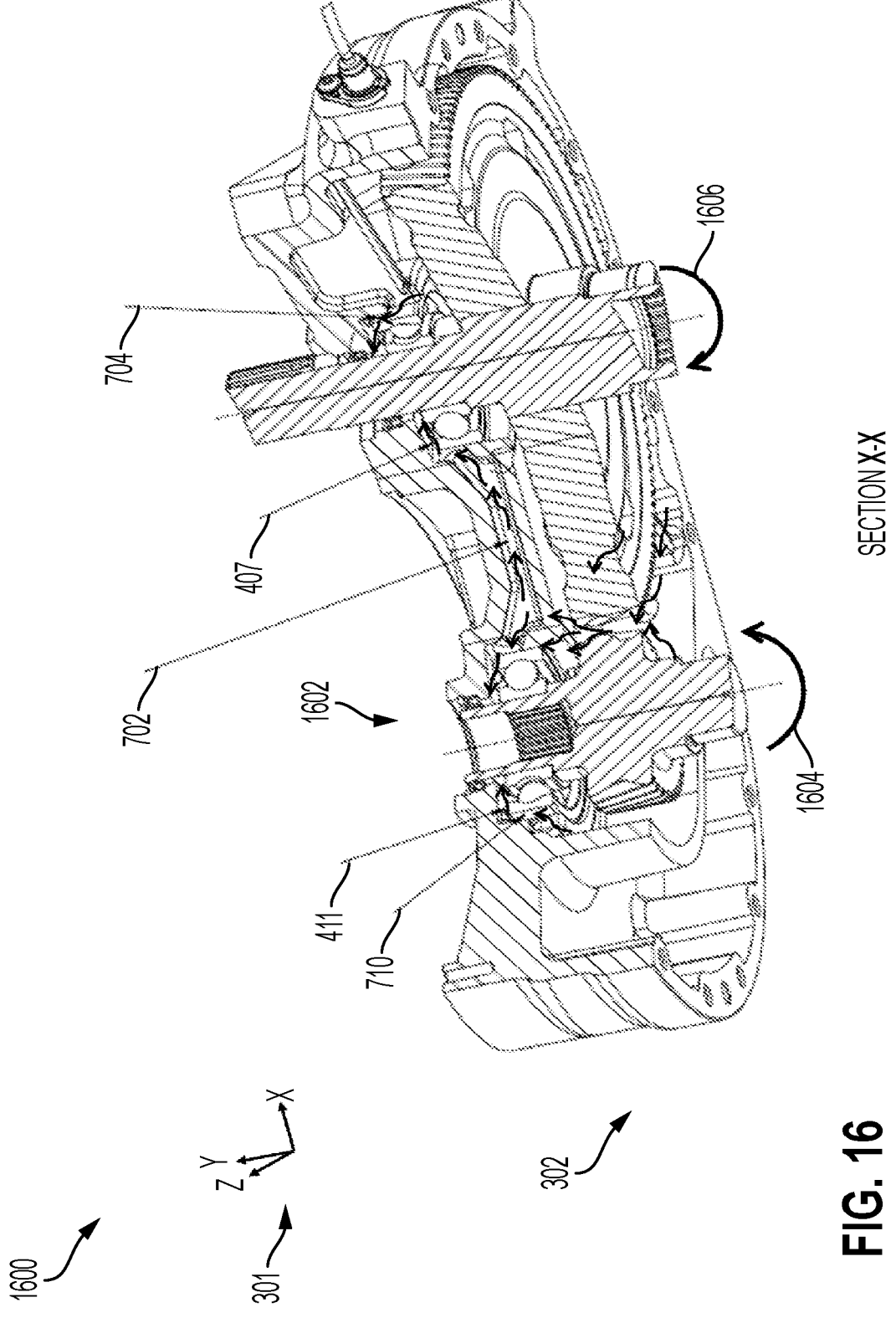
FIG. 16 shows a thirteenth sectional view of the high speed gear box including lubrication flow during clockwise movement of the input pinion shaft.

FIG. 16 shows a thirteenth sectional view 1600 through oil gallery "H" 704, housing oil retainer feature "L" 702, and oil gallery "K" 710. View 1600 may correspond to a section taken along line X-X of FIG. 14. A plurality of arrows 1602 may indicate a direction of lubricant oil flow to motor side output ball bearing 407 and motor side input ball bearing 411 during clockwise rotation of input pinion shaft 408, as indicated by arrow 1604 and counter clockwise rotation of output shaft 404 as indicated by arrow 1606. In some examples, housing oil retainer feature "L" 702 may be replaced with fabricated housing oil retainer feature 1802 as described above with respect to FIGS. 18A-B and FIG. 19 with affect the flow of oil described in FIGS. 13-16.

As shown in FIGS. 9-16, lubricant oil may be continuously circulated at locations within a high speed gear box (e.g., high speed gear box 302) that create friction and thus demand lubricant oil (e.g., bearings such as motor side output ball bearing 407 among others). The technical effect of the plurality of ribs, plurality of oil galleries and oil retainer features described above with respect to FIGS. 5B-8B is that the thermal energy generated by rotation of gears, shafts, and bearings may be absorbed by portions of lubricant oil and subsequently transferred to a housing of the high speed gear box. The high speed gear box housing may be exposed to atmosphere, thus allowing heat absorbed through the housing to be dissipated outside the high speed gear box to the atmosphere. In this way overheating of the high speed gear box may be avoided. Excessive thermal energy generated within the high speed gear box may be dissipated and continuously absorbed by lubricating oil and thus circulated lubricant oil may maintain a temperature when in contact with gears, shafts, bearings, and seals. Maintaining a temperature of lubricant oil may postpone degradation of the lubricated parts (e.g., gears, shafts, bearings, and seals). While gears of the high speed gear box are rotating, rotation of the output helical gear may spread lubricating oil on the inner walls of the high speed gear box, including inner walls of a high speed gear box cover and high speed gear box housing, and some quantity of oil may be collected in an oil retainer feature (e.g., cover oil retainer feature "F" 602 of FIG. 6, among others) which may reduce a total oil quantity in the high speed gear box while the vehicle is moving. In this way a level of oil in an oil sump may be reduced, thereby reducing resistance to movement of gears and increasing a mechanical efficiency of the high speed gear box. Further, maintaining a temperature of the high speed gear box may obviate a demand for an external forced cooling system, reducing a parts and installation cost and power demand of the vehicle.

The disclosure provides support for a powertrain of a vehicle, comprising: a motor, an at least three stage reduction wheel end assembly configured to transfer mechanical power from the motor to a wheel of the vehicle, and wherein a first stage of the at least three stage reduction wheel end assembly is positioned within a high speed gear box, and wherein the high speed gear box includes one or more of a plurality of ribs, a plurality of oil galleries, and oil retainer features configured to circulate lubricant oil throughout the high speed gear box. In a first example of the system, the motor is an electric motor. In a second example of the system, optionally including the first example, the plurality of ribs, the plurality of oil galleries, and the oil retainer features are positioned on an inner surface of a cover of the high speed gear box, and on an inner surface of a housing of the high speed gear box. In a third example of the system, optionally including one or both of the first and second examples, the high speed gear box further includes an output helical gear, and wherein the output helical gear includes elliptical holes positioned around a circumference of the output helical gear. In a fourth example of the system, optionally including one or more or each of the first through third examples, the output helical gear is configured to rotate clockwise or counterclockwise. In a fifth example of the system, optionally including one or more or each of the first through fourth examples, the high speed gear box further includes ball bearings configured to receive lubricant oil accumulated in the plurality of oil galleries and the oil retainer features.

The disclosure also provides support for a high speed gear box of a vehicle, comprising: a high speed gear box cover including a first plurality of ribs, a first plurality of oil galleries, and a cover oil retainer feature, a high speed gear box housing fastened to the high speed gear box cover, the high speed gear box housing including a second plurality of ribs, a second plurality of oil galleries, and a housing oil retainer feature, and an output helical gear positioned between the high speed gear box housing and the high speed gear box cover, and wherein the output helical gear configured to rotate, and wherein rotation of the output helical gear delivers portions of lubricant oil to ball bearings of the high speed gear box. In a first example of the system, the output helical gear is configured to deliver lubricant oil to the first plurality of ribs and to the second plurality of ribs. In a second example of the system, optionally including the first example, the first plurality of ribs is configured to deliver lubricant oil to the first plurality of oil galleries and the cover oil retainer feature. In a third example of the system, optionally including one or both of the first and second examples, the first plurality of oil galleries and the cover oil retainer feature are configured to transfer oil to a reduction side input ball bearing and a reduction side output ball bearing. In a fourth example of the system, optionally including one or more or each of the first through third examples, the cover oil retainer feature is coupled to the high speed gear box cover one or more inner cover fasteners and/or the housing oil retainer feature is coupled to the high speed gear box housing by one or more inner housing fasteners. In a fifth example of the system, optionally including one or more or each of the first through fourth examples, the second plurality of ribs are configured to deliver lubricant oil to the second plurality of oil galleries and the housing oil retainer feature. In a sixth example of the system, optionally including one or more or each of the first through fifth examples, the second plurality of oil galleries and the housing oil retainer feature are configured to transfer lubricant oil to a motor side input ball bearing and a motor side output ball bearing. In a seventh example of the system, optionally including one or more or each of the first through sixth examples, the lubricant oil passes through a motor side input ball bearing, a motor side output ball bearing, a reduction side output ball bearing, and a reduction side input ball bearing and collects in an oil sump. In a eighth example of the system, optionally including one or more or each of the first through seventh examples, the output helical gear is partially submerged in an oil sump, and wherein a level of oil in the oil sump is reduced by rotation of the output helical gear.

The disclosure also provides support for a vehicle, comprising: a plurality of wheels, at least one motor, each of the at least one motor configured to deliver power to one or more wheels of the plurality of wheels via a three stage reduction wheel end assembly, and wherein the three stage reduction wheel end assembly includes a high speed gear box, and wherein the high speed gear box includes an output helical gear, the output helical gear including elliptical holes configured to spread lubricant oil to inner walls of the high speed gear box. In a first example of the system, the one or more wheels receiving power from the at least one motor are front wheels of the vehicle. In a second example of the system, optionally including the first example, the lubricant oil absorbs heat generated by the high speed gear box, and wherein the absorbed heat is transferred to inner walls of the high speed gear box by the lubricant oil. In a third example of the system, optionally including one or both of the first and second examples, the heat transferred to the inner walls of the high speed gear box is dissipated outside the high speed gear box. In a fourth example of the system, optionally including one or more or each of the first through third examples, the high speed gear box is not cooled by an external forced cooling system.

FIGS. 3A-19 are shown to scale, although other relative dimensions may be used, if desired.

FIGS. 1-19 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and subcombinations of the various systems and configurations, and other features, functions, and/or properties disclosed herein.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A high speed gear box of a vehicle, comprising:
a high speed gear box cover including a first plurality of ribs, a first plurality of oil galleries, and a cover oil retainer feature;
a high speed gear box housing fastened to the high speed gear box cover, the high speed gear box housing including a second plurality of ribs, a second plurality of oil galleries, and a housing oil retainer feature; and
an output helical gear positioned between the high speed gear box housing and the high speed gear box cover, wherein the output helical gear is configured to rotate, wherein rotation of the output helical gear delivers portions of lubricant oil to ball bearings of the high speed gear box, wherein the housing oil retainer feature extends between an input motor side ball bearing and an output motor side ball bearing, and wherein multiple ribs of the second plurality of ribs extend radially from the input motor side ball bearing and the output motor side ball bearing and comprise a common end that forms a Y-shape.

2. The high speed gear box of claim 1, wherein the output helical gear is configured to deliver lubricant oil to the first plurality of ribs and to the second plurality of ribs, and wherein the first plurality of ribs and the second plurality of ribs are identical.

3. The high speed gear box of claim 1, wherein the first plurality of ribs is configured to deliver lubricant oil to the first plurality of oil galleries and the cover oil retainer feature, and wherein three ribs of the first plurality of ribs comprise a common end and form a Y-shape.

4. The high speed gear box of claim 1, wherein the first plurality of oil galleries and the cover oil retainer feature are configured to transfer oil to a reduction side input ball bearing and a reduction side output ball bearing.

5. The high speed gear box of claim 1, wherein the cover oil retainer feature is coupled to the high speed gear box cover one or more inner cover fasteners and/or the housing oil retainer feature is coupled to the high speed gear box housing by one or more inner housing fasteners.

6. The high speed gear box of claim 1, wherein the second plurality of ribs are configured to deliver lubricant oil to the second plurality of oil galleries and the housing oil retainer feature.

7. The high speed gear box of claim 1, wherein the second plurality of oil galleries and the housing oil retainer feature are configured to transfer lubricant oil to the input motor side ball bearing and the output motor side ball bearing.

8. The high speed gear box of claim 1, wherein the lubricant oil passes through the input motor side ball bearing, the output motor side ball bearing, a reduction side output ball bearing, and a reduction side input ball bearing, and collects in an oil sump.

9. The high speed gear box of claim 1, wherein the output helical gear is partially submerged in an oil sump, and wherein a level of oil in the oil sump is reduced by rotation of only the output helical gear.

* * * * *